(12) United States Patent
Qin

(10) Patent No.: US 12,192,536 B2
(45) Date of Patent: Jan. 7, 2025

(54) IMAGE FRAME ERROR CONCEALMENT METHOD AND APPARATUS

(71) Applicant: JLQ TECHNOLOGY CO., LTD., Sichuan (CN)

(72) Inventor: Hailin Qin, Sichuan (CN)

(73) Assignee: JLQ TECHNOLOGY CO., LTD., Chengdu (CN)

( * ) Notice: Subject to any disclaimer, the term of this patent is extended or adjusted under 35 U.S.C. 154(b) by 276 days.

(21) Appl. No.: 17/616,555

(22) PCT Filed: Dec. 9, 2019

(86) PCT No.: PCT/CN2019/123890
§ 371 (c)(1),
(2) Date: Dec. 3, 2021

(87) PCT Pub. No.: WO2020/258737
PCT Pub. Date: Dec. 30, 2020

(65) Prior Publication Data
US 2022/0239955 A1  Jul. 28, 2022

(30) Foreign Application Priority Data

Jun. 28, 2019  (CN) .......................... 201910576978.5

(51) Int. Cl.
*H04N 19/895* (2014.01)
*H04N 19/105* (2014.01)
*H04N 19/109* (2014.01)
*H04N 19/11* (2014.01)
*H04N 19/139* (2014.01)
(Continued)

(52) U.S. Cl.
CPC ......... *H04N 19/895* (2014.11); *H04N 19/105* (2014.11); *H04N 19/109* (2014.11);
(Continued)

(58) Field of Classification Search
CPC ...... H04N 19/895; H04N 19/89; H04N 19/44; H04N 19/593; H04N 19/52; H04N 19/176
See application file for complete search history.

(56) References Cited

U.S. PATENT DOCUMENTS

| 10,096,323 B2 | 10/2018 | Sung et al. |
| 2015/0312294 A1* | 10/2015 | Olsen ................... H04N 19/895 |
| | | 348/14.12 |
| 2016/0358612 A1 | 12/2016 | Sung et al. |

FOREIGN PATENT DOCUMENTS

| CN | 1463154 A | 12/2003 |
| CN | 101193312 A | 11/2006 |
| | (Continued) | |

OTHER PUBLICATIONS

International Search Report and Written Opinion mailed Apr. 1, 2020 in International Application PCT/CN2019/123890.
(Continued)

*Primary Examiner* — Kathleen V Nguyen
(74) *Attorney, Agent, or Firm* — Venable LLP

(57) ABSTRACT

The present disclosure discloses an image frame error concealment method including the following steps: determining whether an nth image frame has a packet loss error, and if so, not performing error concealment on the nth image frame; and performing error concealment on an (n+1)th image frame, wherein the error concealment operation is performed with reference to one or more image frames before the nth image frame, wherein n is an integer greater than or equal to 2.

18 Claims, 17 Drawing Sheets

(51) Int. Cl.
*H04N 19/159* (2014.01)
*H04N 19/172* (2014.01)
*H04N 19/176* (2014.01)
*H04N 19/52* (2014.01)
*H04N 19/593* (2014.01)

(52) U.S. Cl.
CPC ........... *H04N 19/11* (2014.11); *H04N 19/139* (2014.11); *H04N 19/159* (2014.11); *H04N 19/172* (2014.11); *H04N 19/176* (2014.11); *H04N 19/52* (2014.11); *H04N 19/593* (2014.11)

(56) References Cited

FOREIGN PATENT DOCUMENTS

| CN | 101193313 A | 6/2008 |
|---|---|---|
| CN | 104751851 A | 7/2015 |
| CN | 105741843 A | 7/2016 |
| CN | 107112022 A | 8/2017 |
| CN | 104751851 B | 4/2018 |
| CN | 109120943 A | 1/2019 |
| CN | 110278436 A | 9/2019 |
| IN | 103067703 A | 4/2013 |

OTHER PUBLICATIONS

The First Office Action issued Jul. 24, 2020 in Chinese Patent Application No. 201910576978.5.
The Second Office Action issued Oct. 2, 2020 in Chinese Patent Application No. 201910576978.5.
The Third Office Action issued Feb. 22, 2021 in Chinese Patent Application No. 201910576978.5.

* cited by examiner

IMAGE FRAME ERROR CONCEALMENT METHOD AND APPARATUS

CROSS-REFERENCE TO RELATED APPLICATIONS

This application is a national stage of International Application No. PCT/CN2019/123890, filed on Dec. 9, 2019, which claims priority to Chinese Patent Application No. 201910576978.5, filed on Jun. 28, 2019. Both of the aforementioned applications are hereby incorporated by reference in their entireties.

TECHNICAL FIELD

The present disclosure relates to a Voice over Long-Term Evolution (VOLTE) video telephony service, a video codec, a Real-time Transport Protocol (RTP) and an embedded system, and particularly, to an image frame error concealment method capable of effectively improving image quality.

BACKGROUND

A VOLTE telephony service is one of core services of 4G communication, and video telephony is one of its main functions. A 4G wireless network based on packet switching can provide a bidirectional real-time audio/video telephony service. Video telephony mainly employs coding algorithms such as MPEG4, H.264, or H.265, and I-frames (intra prediction) and P-frames (inter prediction) are typically used for image coding in a real-time system. Wherein, I-frame decoding does not depend on other images but has a lower compression rate, P-frame decoding has a higher compression rate but needs to refer to previous images for the decoding. In general, in order to ensure effective data compression, a vast majority of video streams are the P-frames. On the other hand, data packet loss of a wireless channel is often inevitable; even if there is only one packet lost, the frame of image cannot be correctly decoded, and the erroneous frame is taken as a reference by its following frames, so that image errors are constantly continued and amplified, and finally, a large number of mosaics appear in the image, which affects subjective experience of a user.

Therefore, for the VOLTE video telephony service, the problem of data packet loss is particularly prominent. A common countermeasure is to perform (feedback) data retransmission in a transport layer, for example, to feedback information of lost packets, information of lost image strips, or feedback information of erroneous macroblocks or the like, through a RTCP (Real-time Transport Control Protocol). Although these methods have different processing procedures and also different amounts of data for retransmission, these methods are all essentially to perform restoration in the transport layer, which can be realized only by cooperation of a peer (with a local) and have certain requirements for bearing quality, that is, an ideal restoration effect can be achieved only in an environment with better wireless signals. If current signals are weak (for example, a terminal is moving or in a relatively complex network environment), not only normal data is prone to packet loss, but also the feedback information or the retransmitted data itself may have packet loss and long time delay, thereby affecting the restoration effect of the transport layer. In addition, the real-time video telephony service is unlikely to wait a long time for the retransmission. When a peer device comes from other manufacturers, it may not support a restoration protocol of the local transport layer at all, and thus it is impossible to perform data restoration at all. It can be seen that the method of data retransmission not only needs the support of protocols of both ends, but also is obviously limited by network conditions.

Since the restoration mechanism of the transport layer cannot cope with all cases, there is inevitably data loss in an output image frame in the case where the restoration of the transport layer fails. If it is desirable that a large number of mosaics and lags should not appear eventually, it is necessary to introduce an error concealment mechanism in a video decoder to improve the image quality.

The error concealment is another image restoration mechanism that works at a different layer from the data retransmission. The error concealment restoration method can make an error of an image be controlled within a limited range without the need of the cooperation of the peer. The error concealment restoration method does not depend on network transmission, and thus, it is a more independent and transparent restoration method. When all upper layer restoration mechanisms are unavailable or the restoration fails, it can only rely on the error concealment function of the decoder to ensure the image quality. Therefore, the error concealment restoration method is not only an important supplement to other restoration mechanisms, but also an ultimate guarantee of the video image quality.

SUMMARY

A technical problem to be solved by the present disclosure is to provide an image frame error concealment method capable of effectively improving the image quality.

An aspect of the present disclosure provides an image frame error concealment method comprising the following steps: determining whether an nth image frame has a packet loss error, and if so, not performing error concealment on the nth image frame; and performing error concealment on an (n+1)th image frame, wherein the error concealment operation is performed with reference to one or more image frames before the nth image frame, wherein n is an integer greater than or equal to 2.

In an embodiment of the present disclosure, when it is determined that the nth image frame has a packet loss error, the method further comprises: attempting to decode the nth image frame; and determining whether one or more macroblocks can be obtained by the decoding, and if so, the error concealment operation comprising performing error concealment with reference to the one or more macroblocks and one or more image frames before the nth image frame, and if not, discarding the nth image frame; wherein the nth image frame is not displayed.

In an embodiment of the present disclosure, the method further comprises decoding an (n+2)th image frame, the decoding operation being performed with reference to the (n+1)th image frame.

In an embodiment of the present disclosure, the step of performing error concealment on an (n+1)th image frame comprises: decoding a first-type intra macroblock capable of being directly and independently decoded in the (n+1)th image frame; decoding a second-type intra macroblock which depends on only the first-type intra macroblock, in the (n+1)th image frame; performing error concealment on an inter macroblock in the (n+1)th image frame with reference to one or more image frames before the nth image frame; and performing error concealment on a third-type intra macroblock not capable of being directly and independently decoded in the (n+1)th image frame.

In an embodiment of the present disclosure, the step of performing error concealment on an inter macroblock in the (n+1)th image frame with reference to one or more image frames before the nth image frame comprises: decoding a motion vector of the inter macroblock; calculating candidate motion vectors; selecting a target motion vector from the candidate motion vectors; and acquiring a reference macroblock from one or more image frames before the nth image frame according to the target motion vector, and decoding the current inter macroblock according to the reference macroblock.

In an embodiment of the present disclosure, the step of performing error concealment on an (n+1)th image frame comprises: decoding a first-type intra macroblock capable of being directly and independently decoded in the (n+1)th image frame; decoding a second-type intra macroblock which depends on only the first-type intra macroblock capable of being directly and independently decoded, in the (n+1)th image frame; performing error concealment on an inter macroblock in the (n+1)th image frame with reference to one or more macroblocks of the nth image frame and one or more image frames before the nth image frame; and performing error concealment on a third-type intra macroblock not capable of being directly and independently decoded in the (n+1)th image frame.

In an embodiment of the present disclosure, the step of performing error concealment on an inter macroblock in the (n+1)th image frame with reference to one or more image frames before the nth image frame comprises: decoding a motion vector of the inter macroblock; calculating candidate motion vectors; determining a position of an image frame in which a reference macroblock is located according to the motion vector; when the reference macroblock is located in the nth image frame, directly decoding the inter macroblock according to the reference macroblock, and ending the process; when the reference macroblock is located in one or more image frames before the nth image frame, selecting a target motion vector from the candidate motion vectors; and acquiring a reference macroblock from one or more image frames before the nth image frame according to the target motion vector, and decoding the current inter macroblock according to the reference macroblock.

In an embodiment of the present disclosure, the step of performing error concealment on a third-type intra macroblock not capable of being directly and independently decoded in the (n+1)th image frame comprises: acquiring a prediction mode of the current third-type intra macroblock; searching remaining third-type intra macroblocks for a related third-type intra macroblock which takes the current third-type intra macroblock as a reference macroblock and has the same prediction mode; acquiring a plurality of sets of candidate reference pixels of the current third-type intra macroblock and the related third-type intra macroblock; decoding the current third-type intra macroblock and the related third-type intra macroblock by using the plurality of sets of candidate reference pixels, to select a target reference pixel; and decoding the current third-type intra macroblock and the related third-type intra macroblock according to the target reference pixel.

Another aspect of the present disclosure provides an image frame error concealment apparatus, comprising: an error detection module for determining whether an nth image frame has a packet loss error; and an error concealment module for not restoring the nth image frame when the nth image frame has a packet loss error, and for performing error concealment on an (n+1)th image frame, wherein the error concealment operation is performed with reference to one or more image frames before the nth image frame, wherein n is an integer greater than or equal to 2.

In an embodiment of the present disclosure, the error concealment module is further used to attempt to decode the nth image frame and determine whether one or more macroblocks can be obtained by the decoding when it is determined that the nth image frame has a packet loss error; wherein if one or more macroblocks can be obtained by the decoding, the error concealment module performs error concealment with reference to the one or more macroblocks and one or more image frames before the nth image frame, and if one or more macroblocks cannot be obtained by the decoding, the error concealment module discards the nth image frame; wherein the nth image frame is not displayed.

In an embodiment of the present disclosure, the error concealment module is further used to decode an (n+2)th image frame, the decoding operation being performed with reference to the (n+1)th image frame.

In an embodiment of the present disclosure, the error concealment module comprises: a first decoding unit for decoding a first-type intra macroblock capable of being directly and independently decoded in the (n+1)th image frame; a second decoding unit for decoding a second-type intra macroblock which depends on only the first-type intra macroblock capable of being directly and independently decoded, in the (n+1)th image frame; a first error concealment unit for performing error concealment on an inter macroblock in the (n+1)th image frame with reference to one or more image frames before the nth image frame; and a second error concealment unit for performing error concealment on a third-type intra macroblock not capable of being directly and independently decoded in the (n+1)th image frame.

In an embodiment of the present disclosure, the first error concealment unit is configured to perform error concealment as follows: decode a motion vector of the inter macroblock; calculate candidate motion vectors; select a target motion vector from the candidate motion vectors; acquire a reference macroblock from one or more image frames before the nth image frame according to the target motion vector, and decode the current inter macroblock according to the reference macroblock.

In an embodiment of the present disclosure, the error concealment module comprises: a first decoding unit for decoding a first-type intra macroblock capable of being directly and independently decoded in the (n+1)th image frame; a second decoding unit for decoding a second-type intra macroblock which depends on only the first-type intra macroblock capable of being directly and independently decoded, in the (n+1)th image frame; a first error concealment unit for performing error concealment on an inter macroblock in the (n+1)th image frame with reference to one or more macroblocks of the nth image frame and one or more image frames before the nth image frame; and a second error concealment unit for performing error concealment on a third-type intra macroblock not capable of being directly and independently decoded in the (n+1)th image frame.

In an embodiment of the present disclosure, the first error concealment unit is configured to perform error concealment as follows: decode a motion vector of the inter macroblock; calculating candidate motion vectors; determine a position of an image frame in which a reference macroblock is located according to the motion vector; when the reference macroblock is located in the nth image frame, directly decode the inter macroblock according to the reference macroblock, and end the process; when the reference macroblock is located in one or more image frames before the nth image frame, select a target motion vector from the candidate motion vectors; and acquire a reference macroblock from one or more image frames before the nth image frame according to the target motion vector, and decode the current inter macroblock according to the reference macroblock.

In an embodiment of the present disclosure, the second error concealment unit is configured to perform error concealment as follows: acquire a prediction mode of the current third-type intra macroblock; search remaining third-type intra macroblocks for a related third-type intra macroblock which takes the current third-type intra macroblock as a reference macroblock and has the same prediction mode; acquire a plurality of sets of candidate reference pixels of the current third-type intra macroblock and the related third-type intra macroblock; decode the current third-type intra macroblock and the related third-type intra macroblock by using the plurality of sets of candidate reference pixels, to select a target reference pixel; and decode the current third-type intra macroblock and the related third-type intra macroblock according to the target reference pixel.

Another aspect of the present disclosure provides a decoding apparatus, comprising: a memory for storing instructions executable by a processor; and the processor for executing the instructions to implement the method as described above.

Another aspect of the present disclosure provides a non-transitory computer-readable storage medium having computer program codes stored thereon which, when executed by a processor, implement the method as described above.

Due to the adoption of the above technical solutions, compared with the related art, the present disclosure has the following remarkable advantages:

Firstly, the image frame error concealment method of the present disclosure is a more reliable and stable image restoration mechanism, and no matter a portion of image data or an entire frame of image is lost, the error concealment effect is not affected, which can better adapt to a complex network environment, and reduce the sensitivity of a video image to data packet loss.

Secondly, the image frame error concealment method of the present disclosure can improve the error concealment effect, reduce broken and discontinuous regions in a restored image, thereby controlling decoding errors of the following image frames within an acceptable range.

Thirdly, the image frame error concealment method of the present disclosure has better compatibility, is suitable for the existing VOLTE video telephony standard and video codec standard, does not need to introduce a private protocol and transfer extra data, and is more transparent to the existing service architecture.

BRIEF DESCRIPTION OF THE DRAWINGS

In order to make the above objectives, features and advantages of the present disclosure more clear and comprehensible, specific implementations of the present disclosure will be described in detail below in conjunction with accompanying drawings, in which.

DETAILED DESCRIPTION

Figure 1:
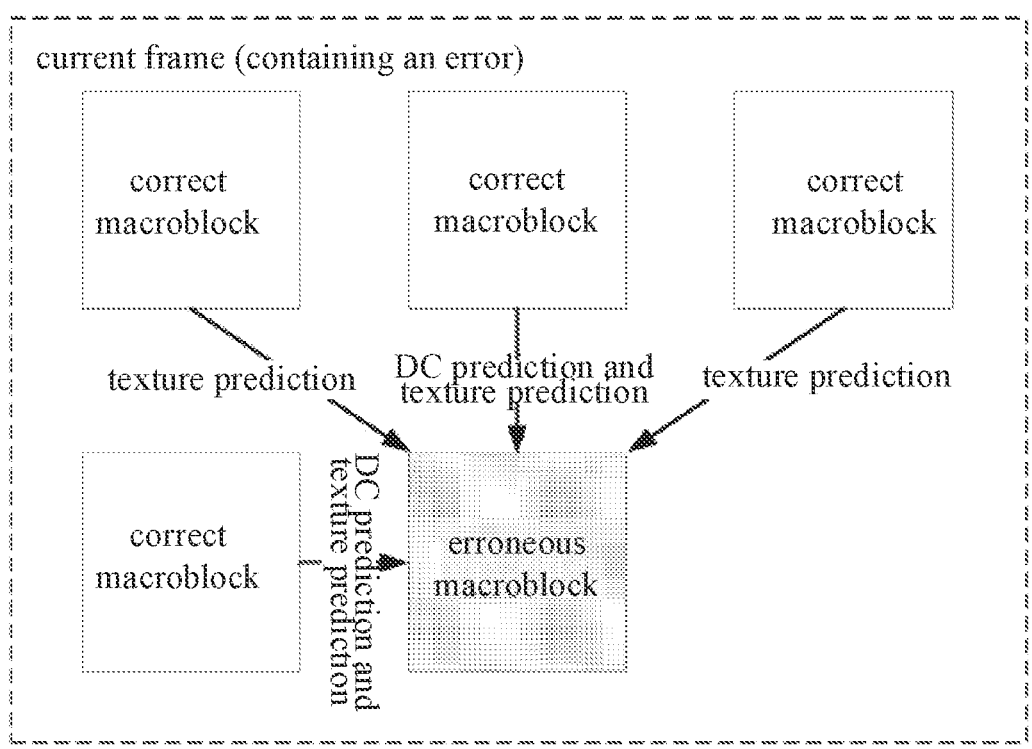
FIG. 1 is a schematic diagram of an existing error concealment method.

In order to make the above objectives, features and advantages of the present disclosure more clear and comprehensible, specific implementations of the present disclosure will be described in detail below in conjunction with the accompanying drawings.

In the following description, many specific details are set forth in order to facilitate a thorough understanding of the present disclosure, but the present disclosure can be implemented in other ways different from those described herein, and thus the present disclosure is not limited to the specific embodiments disclosed below.

As shown in this application and in the claims, words such as "one," "a," "an," and/or "the" and the like are not intended to refer specifically to the singular, but rather are intended to include the plural, unless the context explicitly indicates an exception. In general, terms "include" and "comprise" are intended to only indicate that explicitly identified steps and elements are covered, and these steps and elements do not constitute an exclusive list, so that other steps or elements may also be covered in a method or device.

When embodiments of the present disclosure are described in detail, cross-sectional views illustrating device structures are not in general scale and are enlarged partially for ease of illustration, and the schematic diagrams are only examples, and should not limit the scope of the present disclosure herein. In addition, three-dimensional space dimensions of length, width and depth should be included in actual fabrication.

For ease of description, spatial relation words, such as "under", "below", "lower", "beneath", "above", "on", etc., may be used herein to describe a relation between one element or feature and another element or feature as shown in the accompanying drawings. It will be understood that these spatial relation words are intended to encompass other orientations of a device in use or in operation in addition to the orientations depicted in the accompanying drawings. For example, if a device in an accompanying drawing is turned over, an orientation of an element described as "below" or "under" or "beneath" another element or feature would then be changed into "above" said another element or feature. Thus, the exemplary words "below" and "beneath" can encompass both up and down orientations. Other orientations of the device are also possible (rotated by 90 degrees or at other orientations) and the words herein used for spatial relation description should be explained accordingly. In addition, it will also be understood that when a layer is described as being "between" two layers, it can be the only layer between the two layers, or there may also be one or more layers therebetween.

In the context of this application, a structure described as a first feature being "above" a second feature may include an embodiment in which the first and second features are formed in direct contact, and may also include an embodiment in which an additional feature is formed between the first and second features, such that the first and second features may not be in direct contact.

It should be understood that when a component is described as being "on," "connected to," "coupled to" or "in contact with" another component, it may be directly on, connected or coupled to, or in contact with the other component, or there may be an intervening component therebetween. In contrast, when a component is described as being "directly on," "directly connected to," "directly coupled to" or "in direct contact with" another component, there are no intervening components therebetween. Similarly, when a first component is described as being "in electrical contact with" or "electrically coupled to" a second component, there is an electrical path allowing for current flow between the first component and the second component. The electrical path may include a capacitor, a coupled inductor, and/or another component that allows for current flow, even without direct contact between the conductive components.

The existing error concealment methods take a video macroblock as a unit for error concealment processing, and are mainly classified into two types of error concealment methods according to different types of macroblocks.

FIG. 1 is a schematic diagram of an existing error concealment method. Referring to FIG. 1, if the macroblock is of an intra type, space domain error concealment is employed. The space domain error concealment is to predict a direct-current discrete cosine transform (DCT) coefficient of the current macroblock according to surrounding macroblocks and then perform inverse transformation to obtain a predicted image of the current macroblock; or to predict an image of the current macroblock by performing linear interpolation or directional interpolation according to textures of surrounding macroblocks.

Figure 2:
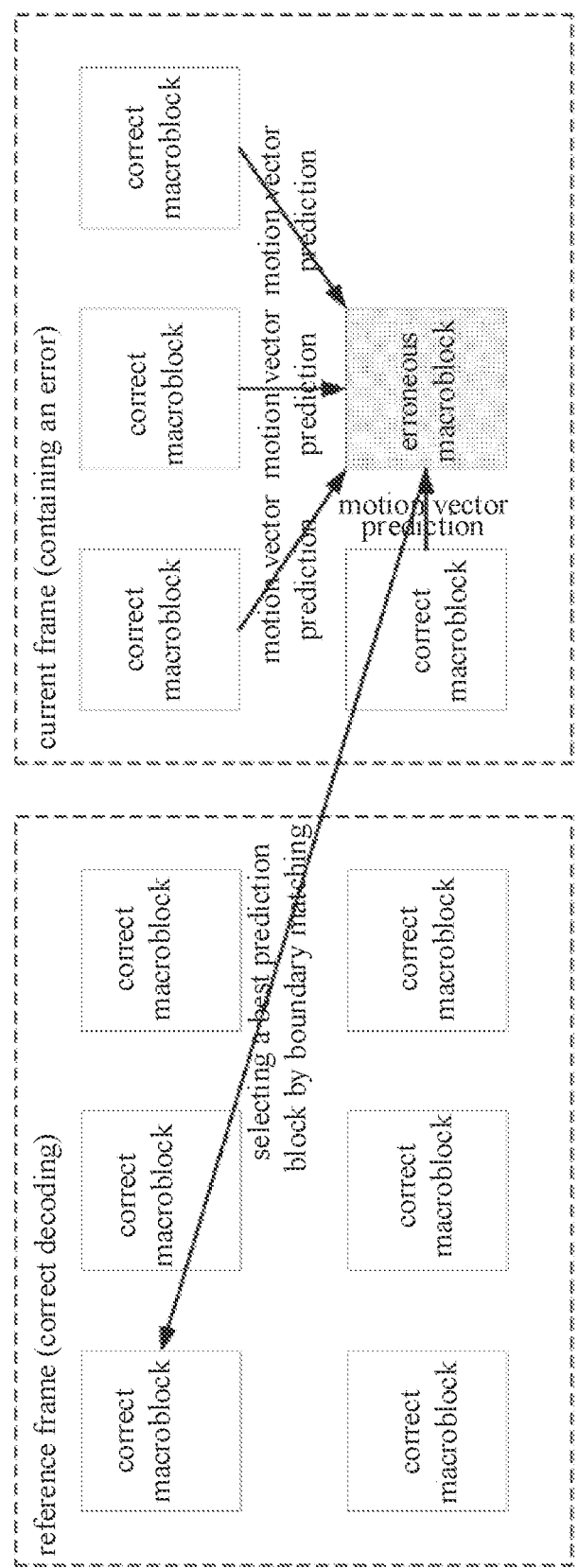
FIG. 2 is a schematic diagram of another existing error concealment method.

FIG. 2 is a schematic diagram of another existing error concealment method. Referring to FIG. 2, if the macroblock is of an inter type, time domain error concealment is employed. Firstly, a list of candidate motion vectors is established, which comprises a zero vector, motion vectors of surrounding macroblocks, a motion vector of a corresponding macroblock in a previous frame and the like. Then, according to a boundary matching principle, a best candidate vector is selected as a prediction motion vector of the current macroblock, and an image block pointed to by the vector is used as an image of the current macroblock.

Existing error concealment methods restore an erroneous frame by methods similar to those described above. The precondition of such methods is that a video frame itself has a relatively complete structure and no continuous and long string of errors appear in the frame data. However, since in an actual environment, network packet loss is common, which often causes a loss of a large segment of video data, such methods cannot guarantee that an erroneous image is reliably restored in most cases. This is specifically embodied in the following aspects:

Firstly, image restoration requires information of a lost macroblock, such as a coding mode of that macroblock, but the information cannot be obtained from the stream after a data packet is lost, and thus, the accuracy of data restoration is directly affected by the lack of the information of the macroblock. Furthermore, although key information of the coding may be delivered redundantly through additional data channels, this means the introduction of a private protocol, and it is impossible to incorporate the private protocol for a standardized service such as VOLTE, and thus, it is unfeasible.

Secondly, the image restoration effect depends greatly on the information of the surrounding macroblocks and the image. In an actual environment, when a bearer finds a data check error, it will directly discard the data packet, so that the frame data error is rare, and the data packet loss is more common. The data packet loss will cause a plurality of slices or an entire frame of image not to be decoded. In this case, except boundary macroblocks of an erroneous region, there is no available reference macroblocks around an internal erroneous macroblock as prediction (even no surrounding data can be referred to in the case of the loss of the entire frame of image), and thus the effect of the space domain error concealment is poor. However, due to the lack of surrounding adjacent motion vectors as candidates, the time domain error concealment can only perform prediction based on a motion vector of a macroblock of a reference frame, which will cause a larger prediction error. Especially when the corresponding macroblock of the reference frame has no motion vector, only a zero vector can be used as a final prediction vector, which undoubtedly will affect the restoration effect. On the other hand, although an FM0 bi-predictive coding technology, such as an H.264 video coding standard, can solve the problem of the surrounding reference macroblocks, it is limited by the compatibility and compression ratio of an encoder, and is difficult to be applied practically.

In addition, the image restoration effect has a large influence on the decoding of a following image. Due to the loss of a large amount of frame data in the erroneous frame, it is difficult to restore a contour and a texture of an object in a lost image region by means of only the surrounding macroblocks and the reference frame. When there is a large error (especially a contour error which greatly affects subjectivity) in an image of an object, if the decoding is still performed based on this image, the image error will spread rapidly, generating more mosaics, thereby resulting in fuzzy image content.

For the video telephony service, the influence of data packet loss on the image quality is, on one hand, embodied as a decoding error of the current frame, and on the other hand, more importantly, embodied as a series of following video frame errors as a result of the current frame error.

Figure 3:
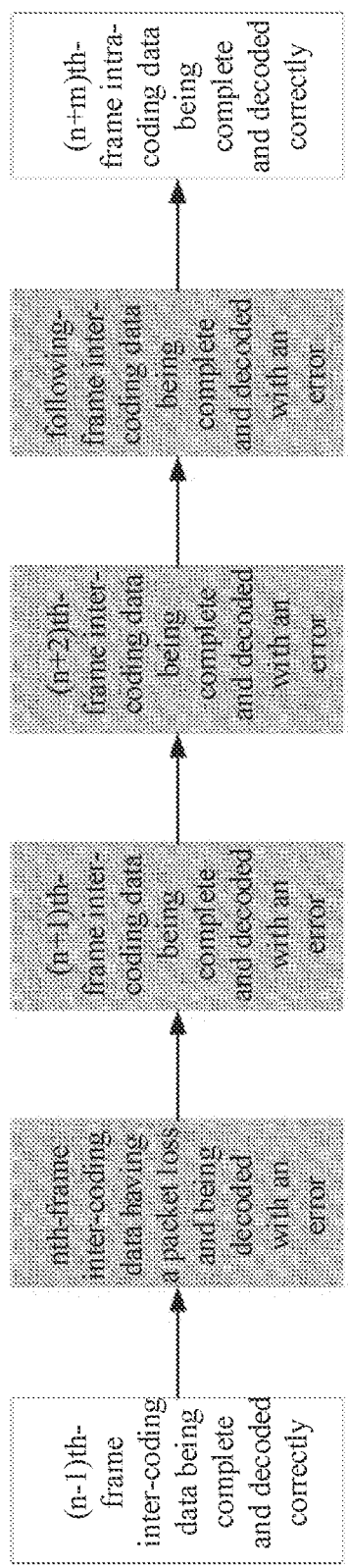
FIG. 3 is a schematic diagram of an existing image frame decoding of an video telephony service.

FIG. 3 is a schematic diagram of an existing image frame decoding of an video telephony service. Referring to FIG. 3, for inter-coded frames from an (n−1)th frame to an (n+m−1)th frame, since the (n+m−1)th frame of the image needs to refer to an (n+m−2)th frame, for example, an (n+1)th frame needs to refer to an nth frame, when there is a data packet loss in the nth frame of the image, it will cause a decoding error of the nth frame (i.e., a portion of the image or the entire frame of image cannot be decoded), and then a decoding error of the (n+1)th frame, and its following frames (an (n+2)th frame, . . . , the (n+m−1)th frame) in sequence will also successively have a decoding error and as a result, a mosaic phenomenon expands rapidly, and a normal image cannot be restored until a next (a (n+m)th frame) intra-coded frame appears. Herein, n is an integer greater than or equal to 2, m is an integer greater than or equal to 2.

In view of the above problems, the following embodiments of the present disclosure describe an image frame error concealment method that can effectively improve the image quality.

It can be understood that the following description is merely exemplary, and that variations can be made by those skilled in the art without departing from the spirit of the present disclosure.

The image frame error concealment method comprises the following steps: determining whether an nth image frame has a packet loss error, and if so, not performing error concealment on the nth image frame; and performing error concealment on an (n+1)th image frame, wherein the error concealment operation is performed with reference to one or more image frames before the nth image frame, wherein n is an integer greater than or equal to 2.

Figure 4:
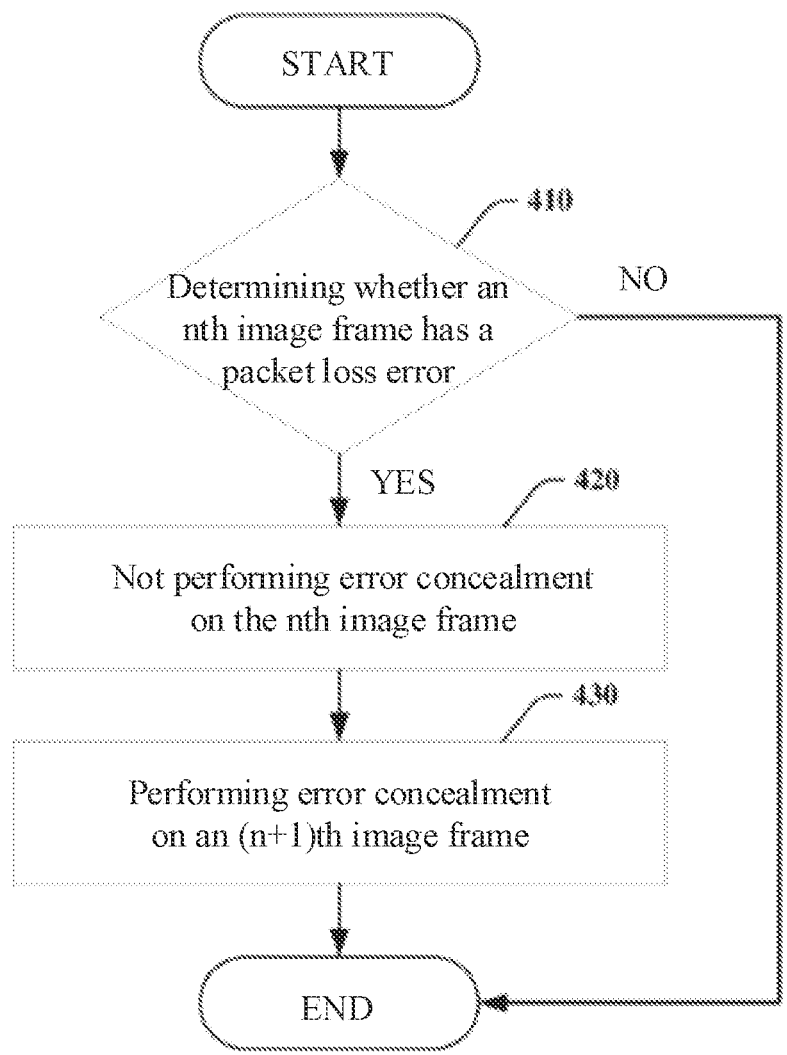
FIG. 4 is a flow diagram of an image frame error concealment method of an embodiment of the present disclosure.

FIG. 4 is a flow diagram of an image frame error concealment method of an embodiment of the present disclosure. Referring to FIG. 4, the steps of the above image frame error concealment method are as follows:

Step 410, determining whether an nth image frame has a packet loss error.

If it is determined that the nth image frame does not have a packet loss error, the process is directly ended, and if it is determined that the nth image frame has a packet loss error, the process proceeds with the following steps.

Step 420, not performing error concealment on the nth image frame.

After it is determined that the nth image frame has a packet loss error, the error concealment is not performed on the nth image frame.

Step 430, performing error concealment on an (n+1)th image frame.

Wherein the error concealment operation is performed with reference to one or more image frames before the nth image frame, wherein n is an integer greater than or equal to 2.

For example, the error concealment operation may be performed with reference to one or more of an (n−1)th image frame, an (n−2)th image frame . . . , and an (n−m)th image frame. Wherein n is an integer greater than or equal to 2, m is a positive integer less than n.

In some examples of the present disclosure, the error concealment operation is performed by preferentially referring to an image frame before and closest to the nth image frame. In some embodiments, the error concealment operation may be performed with reference to only the (n−1)th image frame.

In an embodiment of the present disclosure, the above image frame error concealment method may further comprise decoding an (n+2)th image frame, the decoding operation being performed with reference to the (n+1)th image frame.

For example, in the example shown in FIG. 4, after the step 430, the method may further comprise decoding an (n+2)th image frame (not shown), the decoding operation being performed with reference to the (n+1)th image frame.

Figure 5:
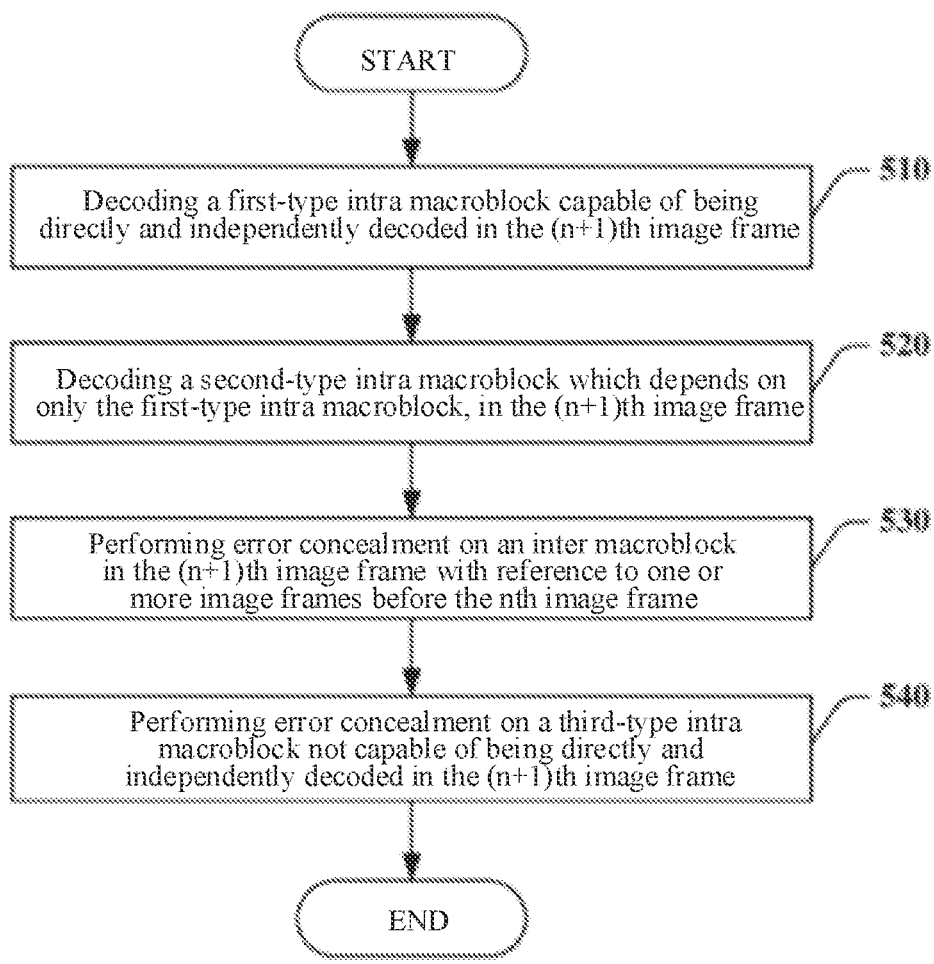
FIG. 5 is a flow diagram of performing error concealment on an (n+1)th image frame of an image frame error concealment method of an embodiment of the present disclosure.

FIG. 5 is a flow diagram of performing error concealment on an (n+1)th image frame of an image frame error concealment method of an embodiment of the present disclosure. Referring to FIG. 5, in an embodiment of the present disclosure, the step of performing error concealment on an (n+1)th image frame comprises:

Step 510, decoding a first-type intra macroblock capable of being directly and independently decoded in the (n+1)th image frame.

Exemplarily, the first-type intra macroblock may be an intra macroblock predicted in a DC mode at a decoding boundary, or may be an intra macroblock predicted in other modes such as horizontal, vertical, and planar modes, but the embodiments of the present disclosure are not limited thereto.

Step 520, decoding a second-type intra macroblock which depends on only the first-type intra macroblock, in the (n+1)th image frame.

Step 530, performing error concealment on an inter macroblock in the (n+1)th image frame with reference to the one or more image frames before the nth image frame.

Step 540, performing error concealment on a third-type intra macroblock not capable of being directly and independently decoded in the (n+1)th image frame.

The third-type intra macroblock directly or indirectly refer to the inter macroblock in the step 530. In some examples, the third-type intra macroblock may employ a space domain prediction mode, but the embodiments of the present disclosure are not limited thereto.

Figure 6:
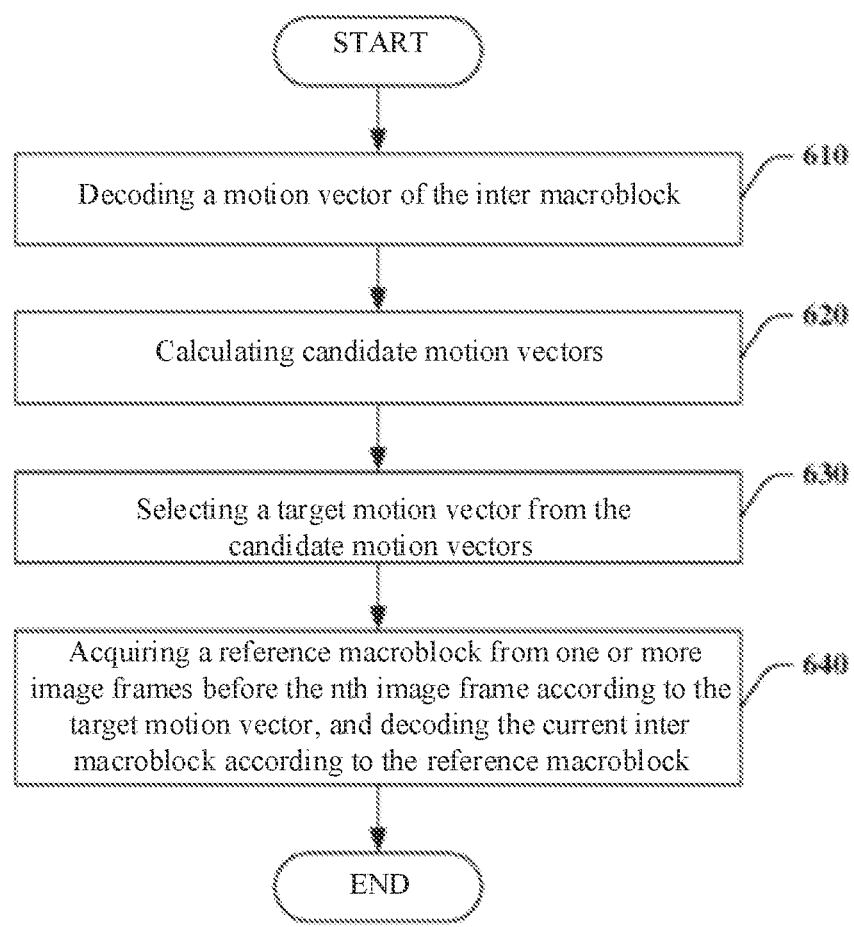
FIG. 6 is a flow diagram of performing error concealment on an inter macroblock in an (n+1)th image frame of an image frame error concealment method of an embodiment of the present disclosure.

FIG. 6 is a flow diagram of performing error concealment on an inter macroblock in an (n+1)th image frame of an image frame error concealment method of an embodiment of the present disclosure. In an embodiment of the present disclosure, in the above step 530, the step of performing error concealment on an inter macroblock in the (n+1)th image frame with reference to the one or more image frames before the nth image frame may comprise:

Step 610, decoding a motion vector of the inter macroblock.

Exemplarily, the inter macroblock may contain only one or more motion vectors.

Step 620, calculating candidate motion vectors.

Exemplarily, the candidate motion vectors may be calculated as follows:

MVcurr=motion vector of current block*Ratio1

Mvleft=motion vector of current left block*Ratio1

Mvtop=motion vector of current top block*Ratio1

MVTemp=motion vector of block at same position in (n−1)th frame*Ratio2 where MV are candidate motion vectors; Ratio1 is a time interval between the (n+1)th frame and the (n−1)th frame/a time interval between the (n+1)th frame and the nth frame; Ratio2 is a time interval between the (n+1)th frame and the (n−1)th frame/a time interval between the (n−1)th frame and the (n−2)th frame.

In an embodiment of the present disclosure, the step 620 may further be followed by establishing a list of candidate motion vectors according to the candidate motion vectors, the list of candidate motion vectors including one or more of MVcurr, MVleft, MVtop, MVTemp.

Step 630, selecting a target motion vector from the candidate motion vectors.

Exemplarily, the target motion vector may be selected from the list of candidate motion vectors according to the boundary matching principle. For example, errors between individual reference macroblocks in the list of candidate motion vectors and the current surrounding image may be calculated in sequence according to the boundary matching principle, and a candidate motion vector with a minimum error is selected. And then, the candidate motion vectors are screened again according to the boundary matching principle, and a target motion vector MVopt is obtained.

In some examples, the candidate motion vectors may be screened again according to the boundary matching principle within a range of 2 pixels of the candidate motion vector with the minimum error, and it may be selected whether to adopt ¼ pixel accuracy as needed. For example, a range of MVX may be [MVXopt−2, MVXopt+1], a range of MVY may be [MVYopt−2, MVYopt+1]. The MVX and the MVY herein are the candidate motion vectors.

Step 640, acquiring a reference macroblock from the one or more image frames before the nth image frame according to the target motion vector, and decoding the current inter macroblock according to the reference macroblock.

Figure 7:
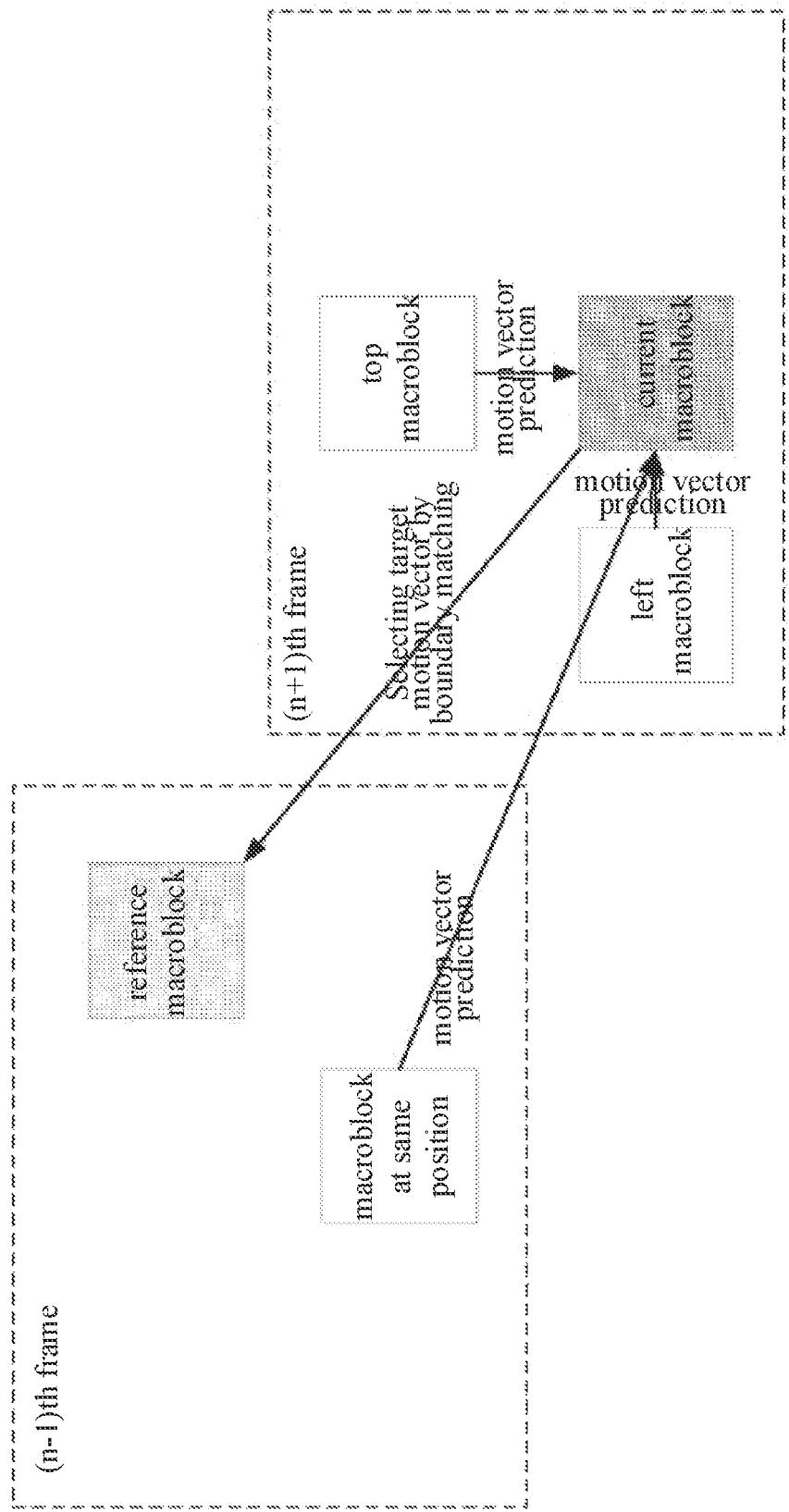
FIG. 7 is a schematic diagram of acquiring a reference macroblock of an image frame error concealment method of an embodiment of the present disclosure.

For example, FIG. 7 is a schematic diagram of acquiring a reference macroblock of an image frame error concealment method of an embodiment of the present disclosure. In the example shown in FIG. 7, the reference macroblock is acquired from the (n−1)th image frame according to the target motion vector, and the current inter macroblock is decoded according to the reference macroblock.

Figure 8:
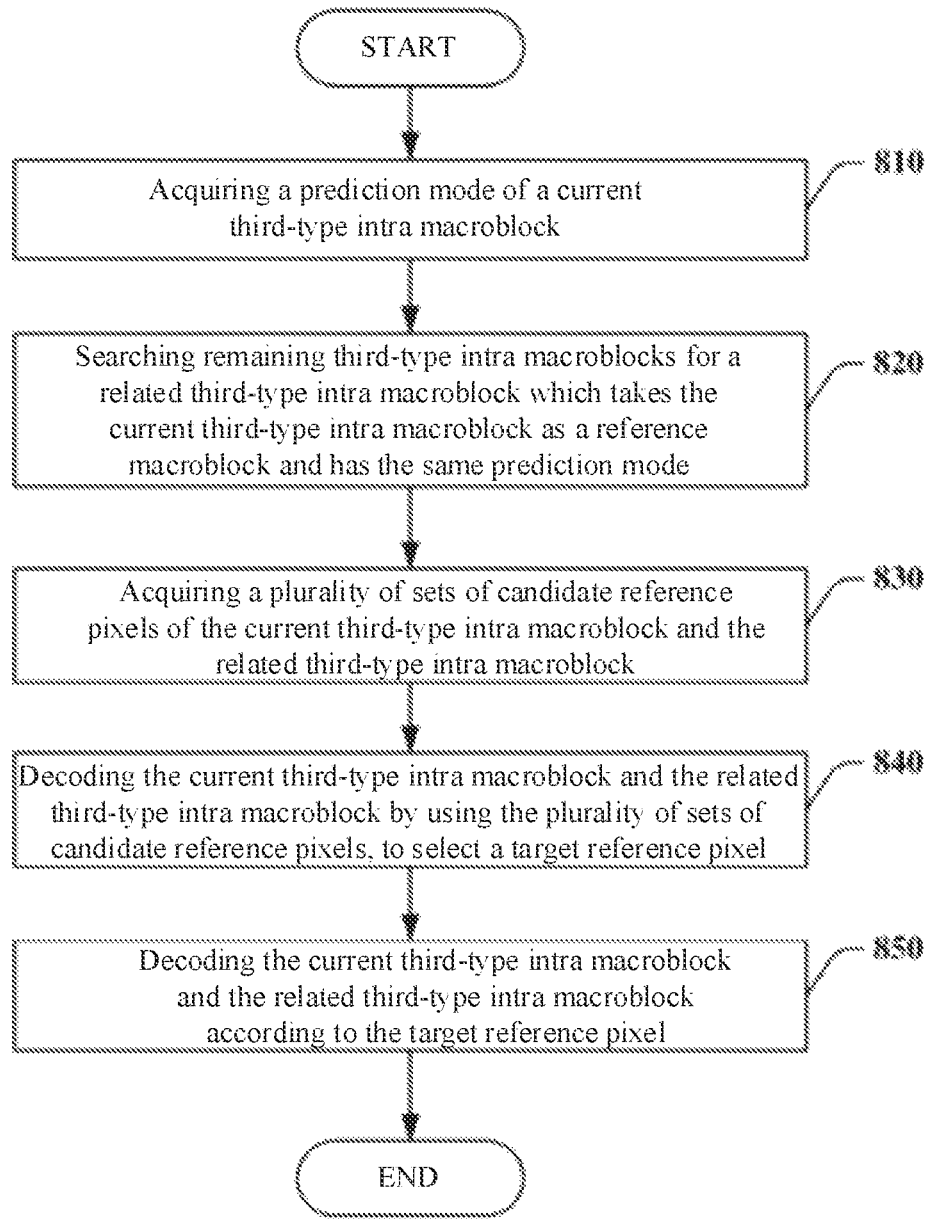
FIG. 8 is a flow diagram of performing error concealment on a third-type intra macroblock not capable of being directly and independently decoded in an (n+1)th image frame of an image frame error concealment method of an embodiment of the present disclosure.

FIG. 8 is a flow diagram of performing error concealment on a third-type intra macroblock not capable of being directly and independently decoded in an (n+1)th image frame of an image frame error concealment method of an embodiment of the present disclosure. In an embodiment of the present disclosure, in the step 540 shown in FIG. 5, the step of performing error concealment on a third-type intra macroblock not capable of being directly and independently decoded in the (n+1)th image frame comprises:

step 810, acquiring a prediction mode of the current third-type intra macroblock.

In some embodiments, the prediction mode may be a horizontal prediction mode. It can be understood that the prediction mode may also be other types of prediction modes, such as a DC prediction mode, a vertical prediction mode, and a planar prediction mode, but the embodiments of the present disclosure are not limited thereto.

Step 820, searching remaining third-type intra macroblocks for a related third-type intra macroblock which takes the current third-type intra macroblock as a reference macroblock and has the same prediction mode.

Figure 9:
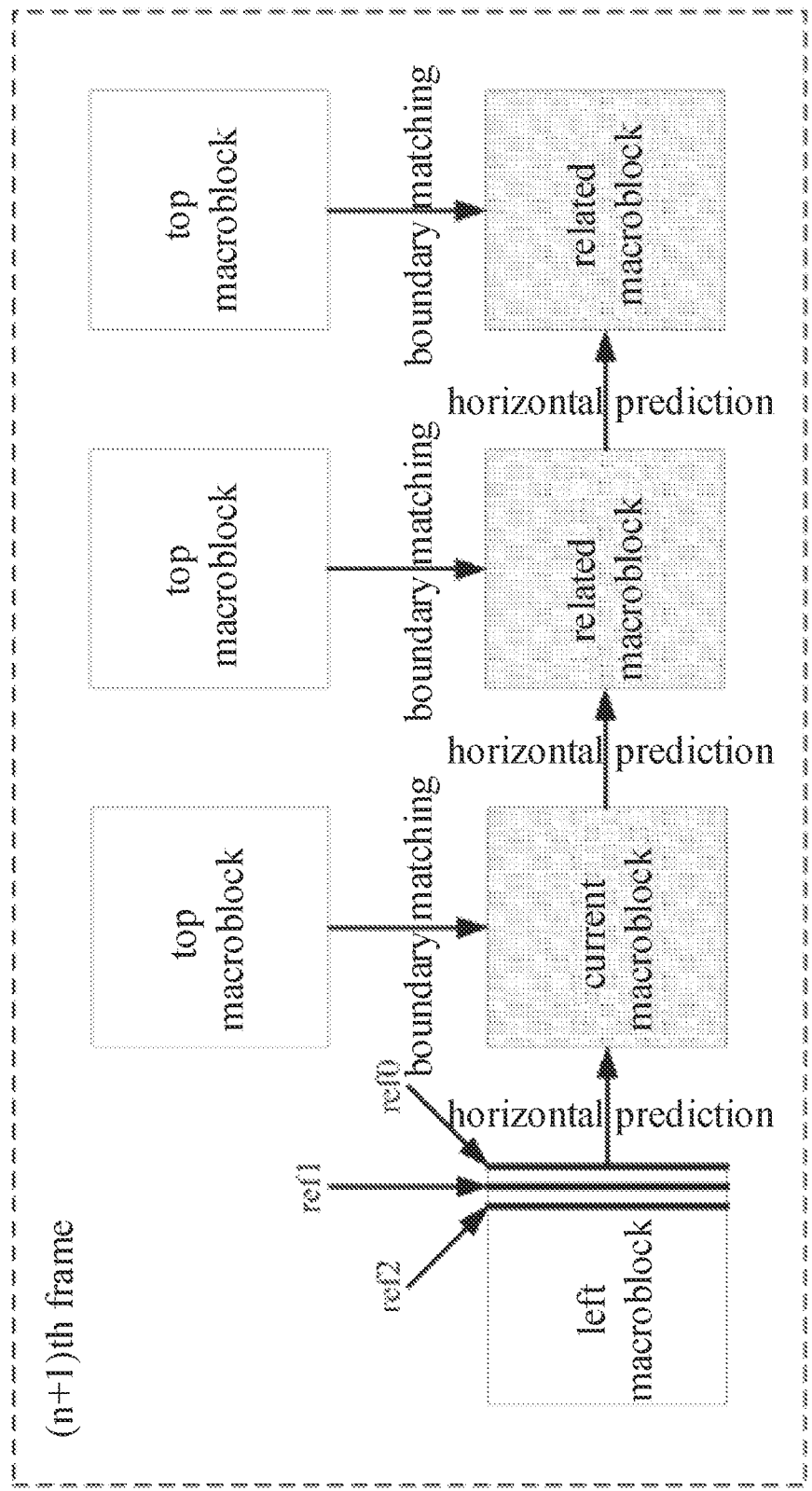
FIG. 9 is a schematic diagram of predicting a related third-type intra macroblock of an image frame error concealment method of an embodiment of the present disclosure.

FIG. 9 is a schematic diagram of predicting a related third-type intra macroblock of an image frame error concealment method of an embodiment of the present disclosure. Exemplarily, when the prediction mode in the step 810 is the horizontal prediction mode, all related macroblocks, which take directly or indirectly the current macroblock as the reference macroblock and are also horizontal prediction, are searched for in the remaining third-type intra macroblocks. For example, in FIG. 9, there are two intra macroblocks to the right of the current macroblock, which are also horizontal prediction and are based on the current macroblock as a reference.

Step 830, acquiring a plurality of sets of candidate reference pixels of the current third-type intra macroblock and the related third-type intra macroblock.

Referring to FIG. 9, a prediction result of the current third-type intra macroblock will affect the prediction of two related macroblocks to its right, so that these macroblocks are treated as a whole. Assuming that coordinates at a top left corner of the current macroblock are xcurr, ycurr, coordinates of reference pixels on the left are xref0=xcurr−1, yref0=ycurr . . . ycurr+15. In order to avoid error transfer caused by a boundary data error of a left macroblock, two sets of reference pixels on the left are additionally selected herein, and their coordinates are xref1=xcurr−2, yref1=ycurr . . . ycurr+15, and xref2=xcurr−3, and yref2=ycurr . . . ycurr+15, respectively. Namely, three sets of candidate reference pixels (xref0, yref0), (xref1, yref1), and (xref2, yref2) are acquired.

Step 840, decoding the current third-type intra macroblock and the related third-type intra macroblock by using the plurality of sets of candidate reference pixels, to select a target reference pixel.

Exemplarily, the current macroblock and the related macroblock to its right may be decoded by using the three sets of reference pixels in the step 830 in sequence, and boundary errors are calculated from the obtained decoding results and surrounding decoded macroblocks according to the boundary matching principle. For example, top macroblocks in FIG. 9 have been decoded, and by calculating boundary errors with respect to these macroblocks, a reference pixel with a minimum error is selected as a target reference pixel xref_opt, yref_opt.

Step 850, decoding the current third-type intra macroblock and the related third-type intra macroblock according to the target reference pixel.

For example, the current third-type intra macroblock and the related third-type intra macroblock may be decoded according to the target reference pixel xref_opt, yref_opt.

The above embodiments use the flow diagrams shown in FIGS. 4 to 6 and FIG. 8 to illustrate the steps/operations performed by the method according to the embodiment of the present application. It should be understood that the above steps/operations are not necessarily performed exactly in this order, but the order may be changed or various steps/operations may be processed simultaneously. Meanwhile, other steps/operations may be added to these steps/operations, or one or more of the steps/operations may be removed from these steps/operations.

In another embodiment of the present disclosure, when it is determined that the nth image frame has a packet loss error, the method may further comprise: attempting to decode the nth image frame; and determining whether one or more macroblocks can be obtained by the decoding, and if so, the error concealment operation comprising performing error concealment with reference to the one or more macroblocks and the one or more image frames before the nth image frame, and if not, discarding the nth image frame.

Figure 10:
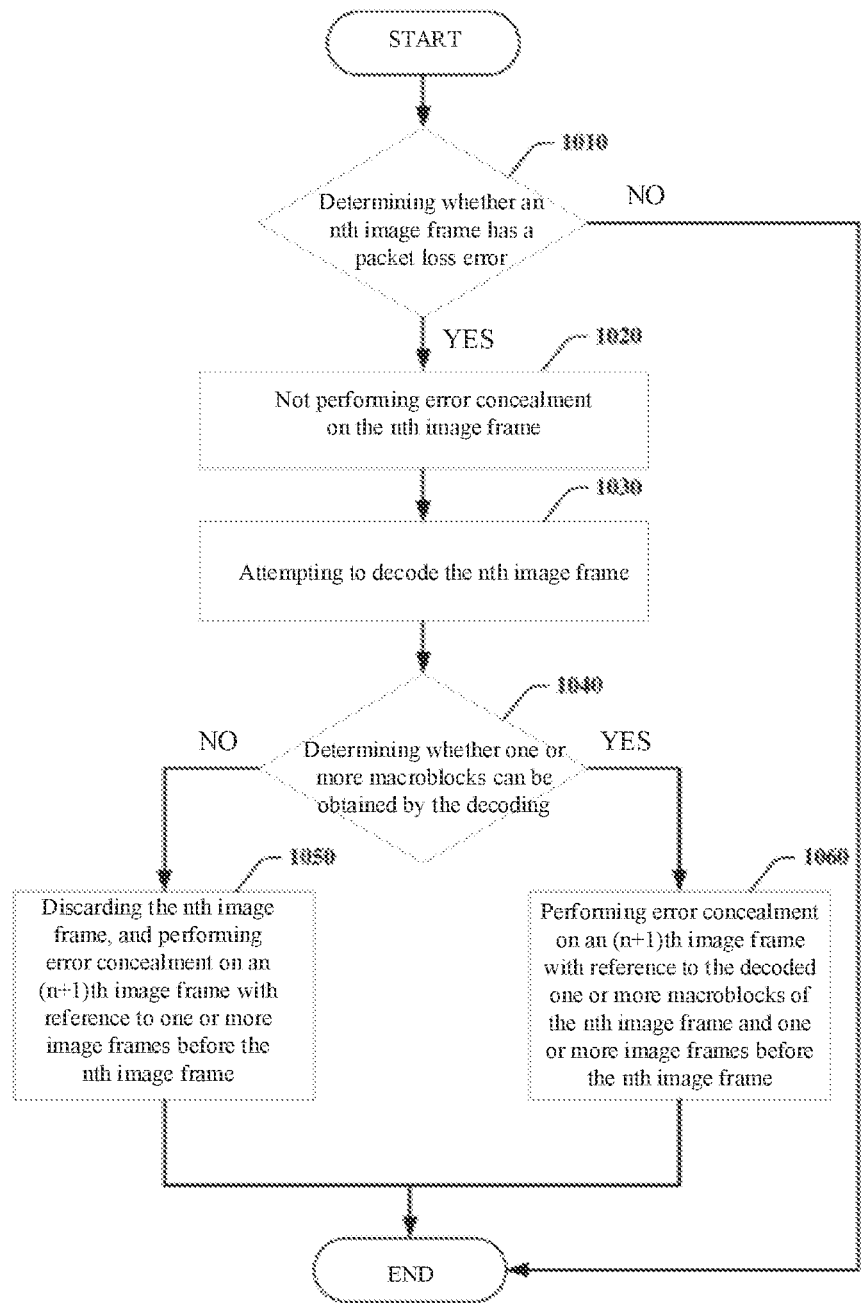
FIG. 10 is a flow diagram of an image frame error concealment method of another embodiment of the present disclosure.

FIG. 10 is a flow diagram of an image frame error concealment method of another embodiment of the present disclosure. The image frame error concealment method will be described below with reference to FIG. 10, and it comprises the following steps:

Step 1010, determining whether an nth image frame has a packet loss error.

If it is determined that the nth image frame does not have a packet loss error, the process is directly ended, and if it is determined that the nth image frame has a packet loss error, the method proceeds with the following steps.

Step 1020, not performing error concealment on the nth image frame.

After it is determined that the nth image frame has a packet loss error, the error concealment is not performed on the nth image frame.

Step 1030, attempting to decode the nth image frame.

Step 1040, determining whether one or more macroblocks can be obtained by the decoding.

It is determined whether one or more macroblocks can be obtained by decoding the nth image frame. Step 1050 is performed if one or more macroblocks cannot be obtained, and step 1060 is performed if one or more macroblocks can be obtained.

Step 1050, discarding the nth image frame, and performing error concealment on an (n+1)th image frame with reference to one or more image frames before the nth image frame. Wherein the nth image frame is not displayed, and n is an integer greater than or equal to 2.

For example, the error concealment operation may be performed with reference to one or more of an (n−1)th image frame, an (n−2)th image frame, . . . , and an (n−m)th image frame. Wherein n is an integer greater than or equal to 2, m is a positive integer less than n.

In some examples of the present disclosure, the error concealment operation is performed by preferentially referring to an image frame before and closest to the nth image frame. In some embodiments, the error concealment operation may be performed with reference to only the (n−1)th image frame.

Step 1060, performing error concealment on the (n+1)th image frame with reference to the decoded one or more macroblocks of the nth image frame and the one or more image frames before the nth image frame. Wherein the nth image frame is not displayed, and n is an integer greater than or equal to 2.

For example, the error concealment operation may comprise performing with reference to the decoded one or more macroblocks of the nth image frame and one or more of the (n−1)th image frame, the (n−2)th image frame, . . . , and the (n−m)th image frame. Wherein, n is an integer greater than or equal to 2, m is a positive integer less than n.

In some examples of the present disclosure, the error concealment operation is performed by preferentially referring to the decoded one or more macroblocks of the nth image frame and an image frame before and closest to the nth image frame. In some embodiments, the error concealment operation may be performed with reference to only the decoded one or more macroblocks of the nth image frame and the (n−1)th image frame.

It should be noted that after attempting to decode the nth image frame, the nth image frame is not displayed regardless of whether one or more macroblocks can be obtained, such that the display quality will not be influenced.

In some embodiments of the present disclosure, the above image frame error concealment method may further comprise decoding an (n+2)th image frame, the decoding operation being performed with reference to the (n+1)th image frame.

For example, in the example shown in FIG. 10, the step 1050 may further be followed by decoding an (n+2)th image frame (not shown), the decoding operation being performed with reference to the (n+1)th image frame.

Figure 11:
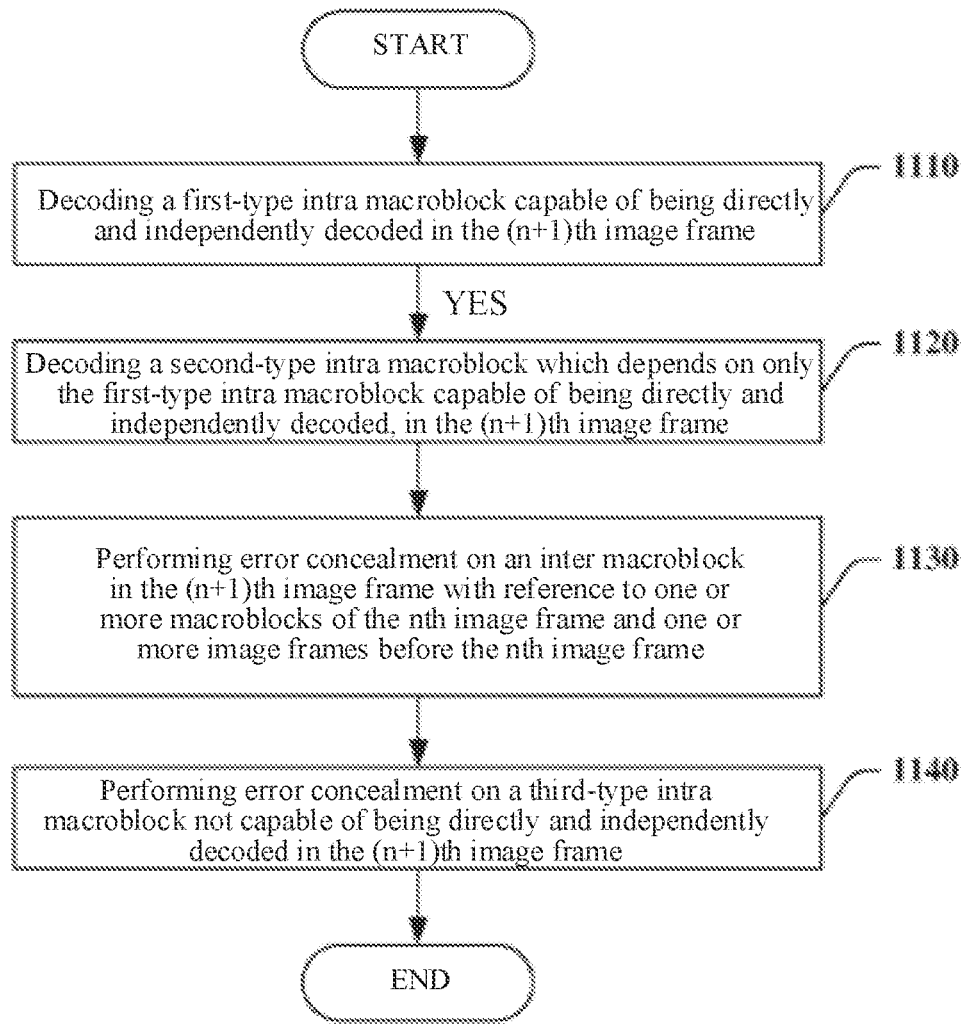
FIG. 11 is a flow diagram of performing error concealment on an (n+1)th image frame of an image frame error concealment method of another embodiment of the present disclosure.

FIG. 11 is a flow diagram of performing error concealment on an (n+1)th image frame of an image frame error concealment method of another embodiment of the present disclosure. Referring to FIG. 11, in an embodiment of the present disclosure, the step of performing error concealment on an (n+1)th image frame comprises:

Step 1110, decoding a first-type intra macroblock capable of being directly and independently decoded in the (n+1)th image frame.

Step 1120, decoding a second-type intra macroblock which depends on only the first-type intra macroblock capable of being directly and independently decoded, in the (n+1)th image frame.

Step 1130, performing error concealment on an inter macroblock in the (n+1)th image frame with reference to the one or more macroblocks of the nth image frame and the one or more image frames before the nth image frame.

Step 1140, performing error concealment on a third-type intra macroblock not capable of being directly and independently decoded in the (n+1)th image frame.

Figure 12:
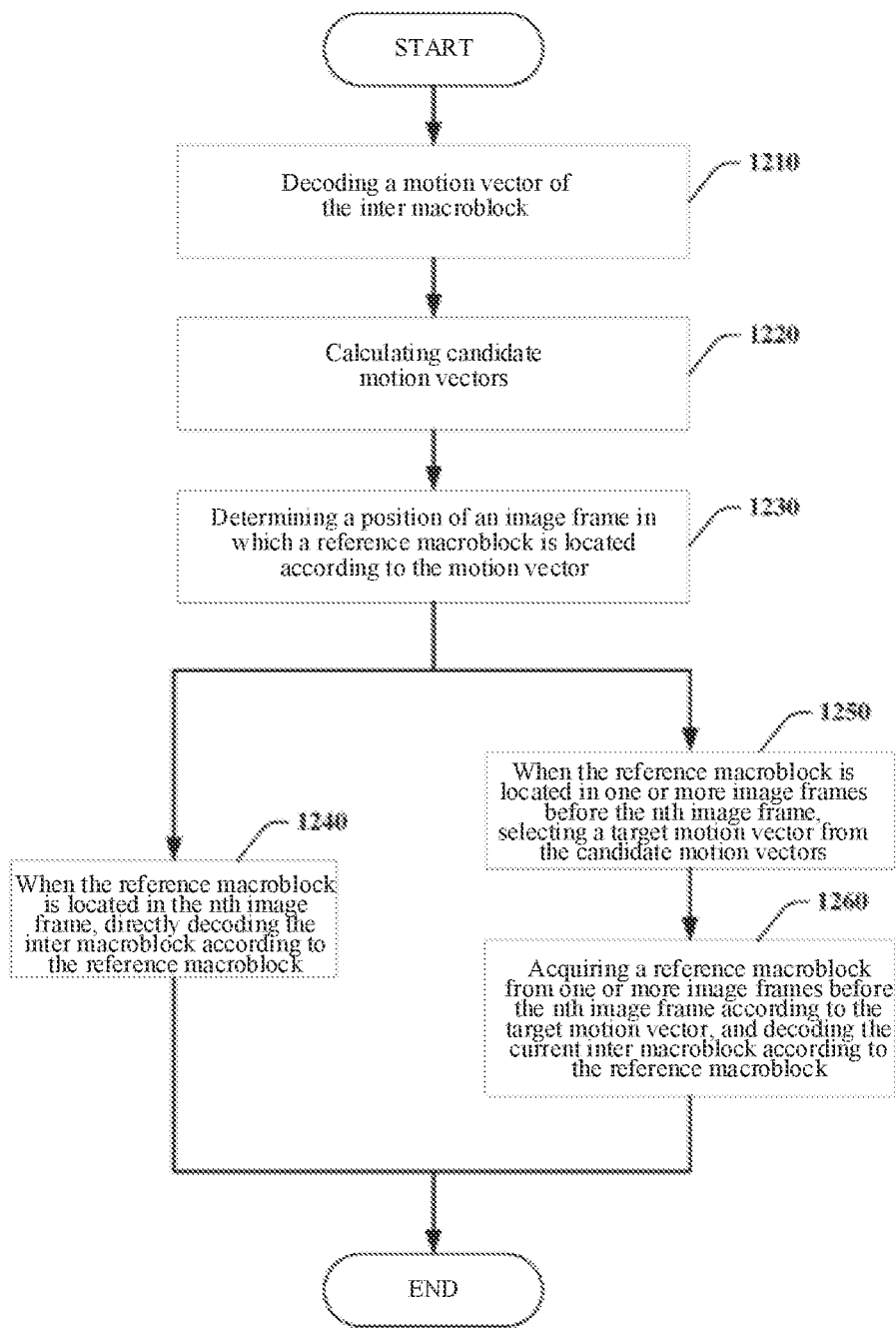
FIG. 12 is a flow diagram of performing error concealment on an inter macroblock in an (n+1)th image frame of an image frame error concealment method of another embodiment of the present disclosure.

FIG. 12 is a flow diagram of performing error concealment on an inter macroblock in an (n+1)th image frame of an image frame error concealment method of another embodiment of the present disclosure. In an embodiment of the present disclosure, in the above step 1130, the step of performing error concealment on an inter macroblock in the (n+1)th image frame with reference to the one or more image frames before the nth image frame may comprise:

Step 1210, decoding a motion vector of the inter macroblock.

Exemplarily, the inter macroblock may contain only one or more motion vectors.

Step 1220, calculating candidate motion vectors.

Exemplarily, the candidate motion vectors may be calculated as follows:

MVcurr=motion vector of current block*Ratio1

Mvleft=motion vector of current left block*Ratio1

Mvtop=motion vector of current top block*Ratio1

MVTemp=motion vector of block at same position in (n−1)th frame*Ratio2 where MV are candidate motion vectors; Ratio1 is a time interval between the (n+1)th frame and the (n−1)th frame/a time interval between the (n+1)th frame and the nth frame; Ratio2 is a time interval between the (n+1)th frame and the (n−1)th frame/a time interval between the (n−1)th frame and the (n−2)th frame.

In some embodiments of the present disclosure, the step 1220 may further be followed by establishing a list of candidate motion vectors according to the candidate motion vectors, the list of candidate motion vectors comprising one or more of MVcurr, MVleft, MVtop, MVTemp.

Step 1230, determining a position of an image frame in which a reference macroblock is located according to the motion vector.

Step 1240, when the reference macroblock is located in the nth image frame, directly decoding the inter macroblock according to the reference macroblock, and ending the process.

If the reference macroblock is contained in a decoded region of the nth frame, a correct inter macroblock is decoded directly according to the reference macroblock, and then the process is ended.

Step 1250, when the reference macroblock is located in the one or more image frames before the nth image frame, selecting a target motion vector from the candidate motion vectors.

If the reference macroblock is not contained in the decoded region of the nth frame, and the reference macroblock is located in the one or more image frames before the nth image frame, the target motion vector is selected from the list of candidate motion vectors.

Exemplarily, the target motion vector may be selected from the list of candidate motion vectors according to the boundary matching principle. For example, errors between individual reference macroblocks in the list of candidate motion vectors and the current surrounding image may be calculated in sequence according to the boundary matching principle, and a candidate motion vector with a minimum error is selected. And then, the candidate motion vectors are screened again according to the boundary matching principle, and a target motion vector MVopt is obtained.

In some examples, the candidate motion vectors may be screened again according to the boundary matching principle within a range of 2 pixels of the candidate motion vector with the minimum error, and it may be selected whether to adopt ¼ pixel accuracy as needed. For example, a range of MVX may be [MVXopt−2, MVXopt+1], a range of MVY may be [MVYopt−2, MVYopt+1]. The MVX and the MVY herein are the candidate motion vectors.

Step 1260, acquiring a reference macroblock from the one or more image frames before the nth image frame according to the target motion vector, and decoding the current inter macroblock according to the reference macroblock.

For example, in the example shown in FIG. 7, a reference macroblock is acquired from the (n−1)th image frame according to the target motion vector, and the current inter macroblock is decoded according to the reference macroblock.

Referring to FIG. 8, in some embodiments of the present disclosure, in the step 1140 of FIG. 11, the step of performing error concealment on a third-type intra macroblock not capable of being directly and independently decoded in the (n+1)th image frame comprises:

Step 810, acquiring a prediction mode of the current third-type intra macroblock.

Step 820, searching remaining third-type intra macroblocks for a related third-type intra macroblock which takes the current third-type intra macroblock as a reference macroblock and has the same prediction mode.

Step 830, acquiring a plurality of sets of candidate reference pixels of the current third-type intra macroblock and the related third-type intra macroblock.

Step 840, decoding the current third-type intra macroblock and the related third-type intra macroblock by using the plurality of sets of candidate reference pixels, to select a target reference pixel.

Step 850, decoding the current third-type intra macroblock and the related third-type intra macroblock according to the target reference pixel.

Other implementation details of the present embodiment may refer to the embodiments described in FIGS. 8 to 9, and are not described herein.

Figure 13:
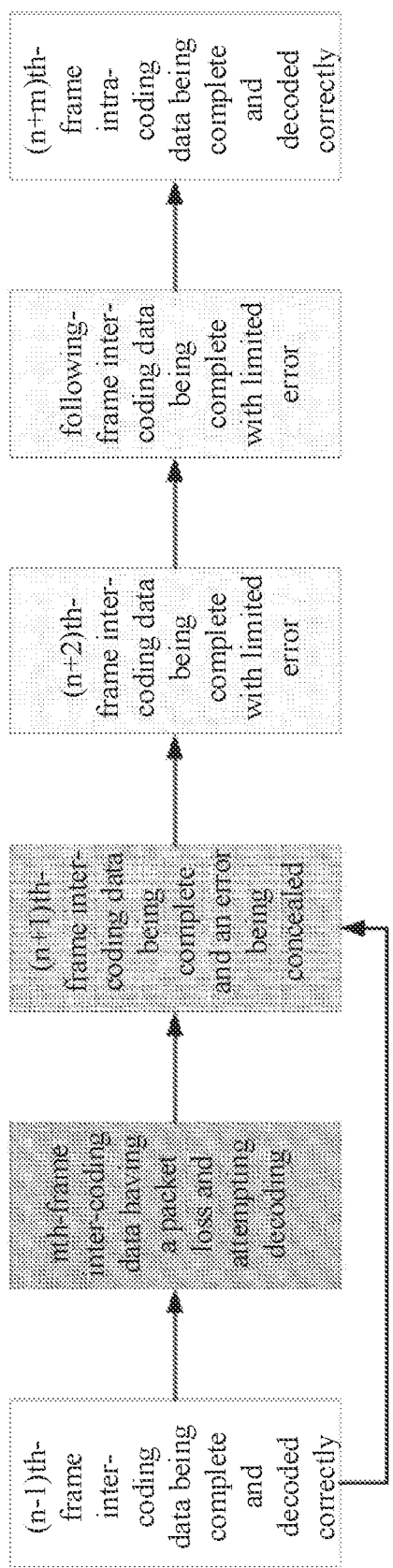
FIG. 13 is a schematic diagram of image frame decoding of a video telephony service employing an image frame error concealment method of an embodiment of the present disclosure.

FIG. 13 is a schematic diagram of image frame decoding of a video telephony service employing an image frame error concealment method of an embodiment of the present disclosure. Referring to FIG. 13, for the inter-coded frames from the (n−1)th frame to the (n+m−1)th frame, since the (n+2)th frame and each frame thereafter of the image need to refer to a previous frame thereof, for example, the (n+2)th frame of the image needs to refer to the (n+1)th frame, after the error concealment on the (n+1)th frame of the image is performed, the (n+2)th frame and each frame thereafter (the (n+3)th frame, . . . , the (n+m−1)th frame) in sequence will be able to be decoded according to the normal process. Wherein, n is an integer greater than or equal to 2, m is an integer greater than or equal to 2.

Compared with the existing image frame decoding of the video telephony service shown in FIG. 3, the image frame error concealment method of the present disclosure enables, after performing error concealment on the (n+1)th frame of the image, the data decoding errors of the (n+2)th image frame and each image frame thereafter to be effectively controlled, so that mosaic phenomena such as broken object are reduced, thereby restoring a correct image.

The above embodiments use the flow diagrams shown in FIGS. 10 to 12 and FIG. 8 to illustrate the steps/operations performed by the method according to the embodiments of the present application. It should be understood that the above steps/operations are not necessarily performed exactly in order, but the order can be changed, or various steps/operations can be processed simultaneously. Meanwhile, other steps/operations may be added to these steps/operations, or one or more of the steps/operations may be removed from these steps/operations.

The above embodiments of the present disclosure describe an image frame error concealment method capable of effectively improving the image quality.

Another aspect of the present disclosure provides an image frame error concealment apparatus capable of effectively improving the image quality.

Figure 14:
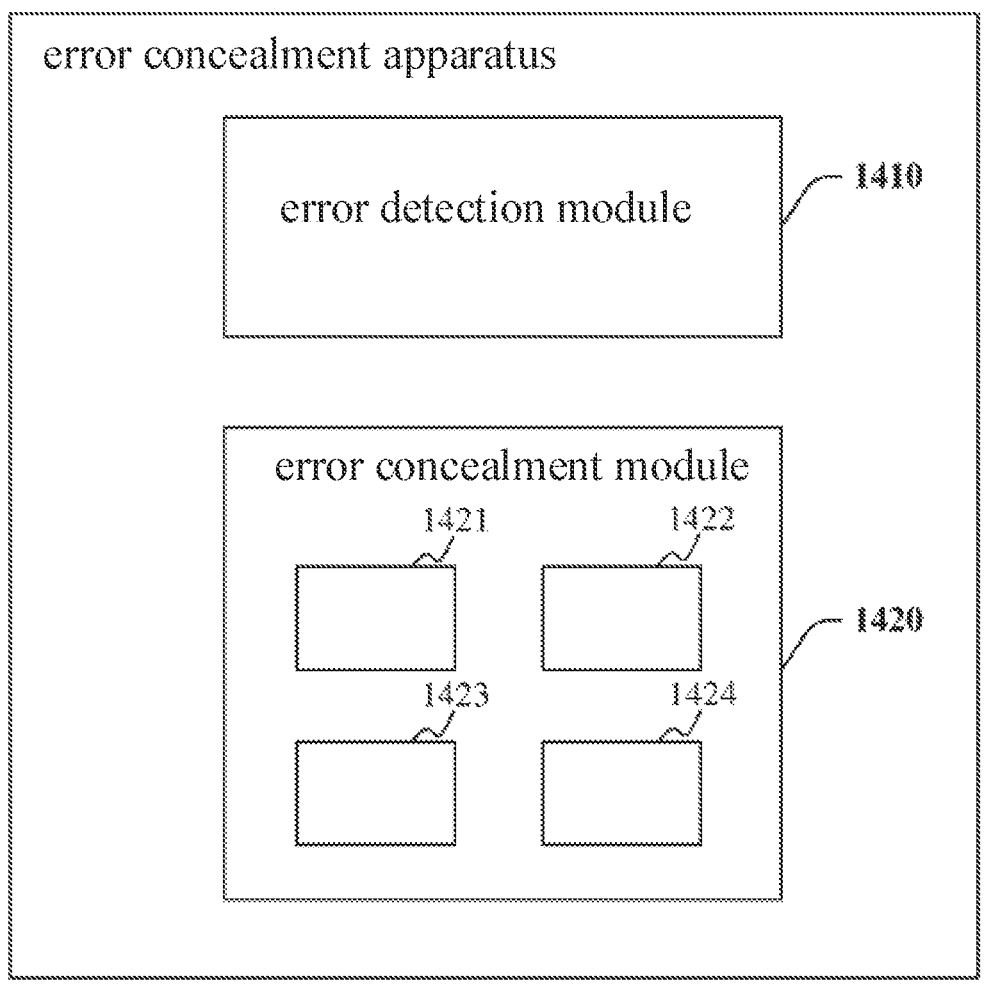
FIG. 14 is a schematic diagram of an image frame error concealment apparatus of an embodiment of the present disclosure.

FIG. 14 is a schematic diagram of an image frame error concealment apparatus of an embodiment of the present disclosure. The image frame error concealment method of the embodiment of the present disclosure shown in FIGS. 4 to 13 can be implemented in the image frame error concealment apparatus 1400 shown in FIG. 14 or a variation thereof, but the embodiments of the present disclosure are not limited thereto.

It should be understood that the image frame error concealment apparatus 1400 shown in FIG. 14 may further be integrated in a processor and form a decoding apparatus with other components such as a memory.

Referring to FIG. 14, the image frame error concealment apparatus 1400 comprises an error detection module 1410 and an error concealment module 1420. The error detection module 1410 is used to determine whether an nth image frame has a packet loss error. The error concealment module 1420 is used to not restore the nth image frame when the nth image frame has a packet loss error, and to perform error concealment on an (n+1)th image frame. Wherein the error concealment operation is performed with reference to one or more image frames before the nth image frame, wherein n is an integer greater than or equal to 2.

In some embodiments, the error concealment module 1420 is further used to decode an (n+2)th image frame, the decoding operation being performed with reference to the (n+1)th image frame.

Referring to FIG. 14, in an embodiment of the present disclosure, the error concealment module 1420 may further comprise: a first decoding unit 1421, a second decoding unit 1422, a first error concealment unit 1423, and a second error concealment unit 1424.

The first decoding unit 1421 is used to decode a first-type intra macroblock capable of being directly and independently decoded in the (n+1)th image frame. The second decoding unit 1422 is used to decode a second-type intra macroblock which depends on only the first-type intra macroblock capable of being directly and directly and independently decoded, in the (n+1)th image frame. The first error concealment unit 1423 is used to perform error concealment on an inter macroblock in the (n+1)th image frame with reference to the one or more image frames before the nth image frame. The second error concealment unit 1424 is used to perform error concealment on a third-type intra macroblock not capable of being directly and independently decoded in the (n+1)th image frame.

In an embodiment of the present disclosure, the first error concealment unit 1423 is configured to perform error concealment as follows: decoding a motion vector of the inter macroblock; calculating candidate motion vectors; selecting a target motion vector from the candidate motion vectors; acquiring a reference macroblock from the one or more image frames before the nth image frame according to the target motion vector, and decoding the current inter macroblock according to the reference macroblock.

Referring to FIG. 14, in another embodiment of the present disclosure, the error concealment module 1420 is further used to attempt to decode the nth image frame and determine whether one or more macroblocks can be obtained by the decoding when it is determined that the nth image frame has a packet loss error. Wherein, if one or more macroblocks can be obtained by the decoding, the error concealment module 1420 performs error concealment with reference to the one or more macroblocks and the one or more image frames before the nth image frame, and if one or more macroblocks cannot be obtained by the decoding, the error concealment module 1420 discards the nth image frame, wherein the nth image frame is not displayed.

In some embodiments, the error concealment module 1420 is further used to decode an (n+2)th image frame, the decoding operation being performed with reference to the (n+1)th image frame.

The first decoding unit 1421 is used to decode a first-type intra macroblock capable of being directly and independently decoded in the (n+1)th image frame. The second decoding unit 1422 is used to decode a second-type intra macroblock which depends on only the first-type intra macroblock capable of being directly and independently decoded, in the (n+1)th image frame. The first error concealment unit 1423 is used to perform error concealment on an inter macroblock in the (n+1)th image frame with reference to the one or more macroblocks of the nth image frame and the one or more image frames before the nth image frame. The second error concealment unit 1424 is used to perform error concealment on a third-type intra macroblock not capable of being directly and independently decoded in the (n+1)th image frame.

The first error concealment unit 1423 may be configured to perform error concealment as follows: decoding a motion vector of the inter macroblock; calculating candidate motion vectors; determining a position of an image frame in which a reference macroblock is located according to the motion vector; when the reference macroblock is located in the nth image frame, directly decoding the inter macroblock according to the reference macroblock, and ending the process; when the reference macroblock is located in the one or more image frames before the nth image frame, selecting a target motion vector from the candidate motion vectors; acquiring a reference macroblock from the one or more image frames before the nth image frame according to the target motion vector, and decoding the current inter macroblock according to the reference macroblock.

In an embodiment of the present disclosure, the second error concealment unit 1424 is configured to perform error concealment as follows: acquiring a prediction mode of the current third-type intra macroblock; searching remaining third-type intra macroblocks for a related third-type intra macroblock which takes the current third-type intra macroblock as a reference macroblock and has the same prediction mode; acquiring a plurality of sets of candidate reference pixels of the current third-type intra macroblock and the related third-type intra macroblock; decoding the current third-type intra macroblock and the related third-type intra macroblock by using the plurality of sets of candidate reference pixels, to select a target reference pixel; decoding the current third-type intra macroblock and the related third-type intra macroblock according to the target reference pixel.

Other implementation details of the image frame error concealment apparatus of the present embodiment can refer to the embodiments described in FIGS. 4 to 13, and are not described herein.

Another aspect of the present disclosure provides a decoding apparatus capable of effectively improving the image quality.

Figure 15:
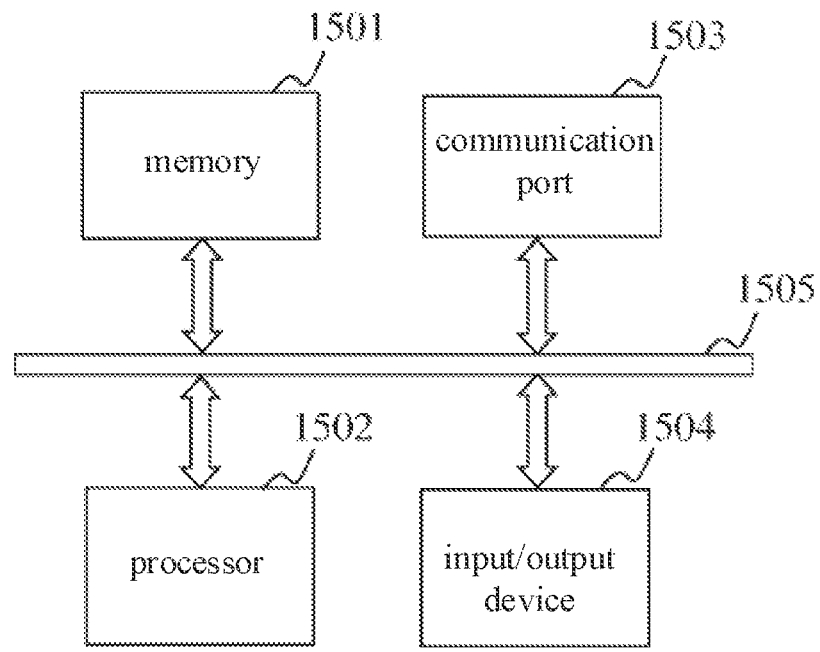
FIG. 15 is a schematic diagram of a decoding apparatus of an embodiment of the present disclosure.

FIG. 15 is a schematic diagram of a decoding apparatus of an embodiment of the present disclosure. Referring to FIG. 15, the decoding apparatus 1500 comprises a memory 1501 and a processor 1502. The memory 1501 is used to store instructions executable by the processor. The processor 1502 is used to execute the instructions to implement the image frame error concealment method described above.

In some embodiments of the present disclosure, the decoding apparatus 1500 further comprises a communication port 1503, an input/output device 1504, and an internal communication bus 1505.

The communication port 1503 may be responsible for data communication between the decoding apparatus 1500 and an external device (not shown). The input/output device 1504 may support input/output data flows between the decoding apparatus 1500 and other components. As an example, the input/output device 1504 may comprise one or more of the following components: input devices such as a keyboard, a mouse, a camera, a display, a scanner, a touch screen, a handwriting input panel, and a microphone, or any combination thereof. The input/output device 1504 can input not only various numerical data but also various non-numerical data such as graphics, images, sounds, into the decoding apparatus 1500. The internal communication bus 1505 can enable data communication between various components of the decoding apparatus 1500.

It can be understood that the image frame error concealment method of the present application is not limited to be implemented by one decoding apparatus, but may be cooperatively implemented by a plurality of on-line decoding apparatuses. The on-line decoding apparatuses can connect and communicate via a local area network or a wide area network.

Other implementation details of the decoding apparatus of the present embodiment may refer to the embodiments described in FIGS. 4 to 13, and are not described herein.

Exemplarily, when the input device is a camera and the output device is a display screen in the decoding apparatus 1500 shown in FIG. 15, a combination of one or more on-line decoding apparatuses 1500 and an external device or an external network can be implemented as a VOLTE video telephony system.

Figure 16:
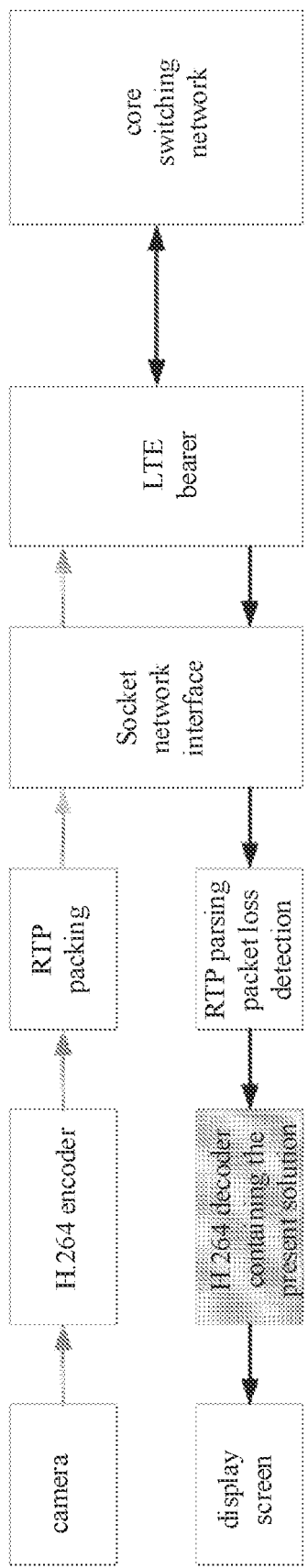
FIG. 16 is a schematic diagram of a VOLTE video telephony system of an embodiment of the present disclosure.

FIG. 16 is a schematic diagram of a VOLTE video telephony system of an embodiment of the present disclosure. Referring to FIG. 16, gray arrows represent an uplink data stream, black arrows represent a downlink data stream, wherein a downlink H.264 video decoder is integrated with the image frame error concealment method of an embodiment of the present disclosure.

The uplink data flow of the VOLTE video telephony system comprises: acquiring images by a camera; encoding the images into video data frames by using an H.264 encoder; packing the data frames into RTP packets; sending RTP data through a Socket network interface; finally, sending the data to a core network through a LTE bearer.

The downlink data flow of the VOLTE video telephony system comprises: receiving, by the LTE bearer, the video data forwarded by the core network; acquiring the RTP data through the Socket network interface; parsing the RTP data packets, and detecting data packet loss at the same time, if there is no data packet loss, outputting complete video image frames, otherwise, outputting incomplete image frames; processing, by the decoder, the image frames, and if the image frame is complete, decoding according to the H.264 standard, otherwise, according to the image frame error concealment method of the present disclosure, attempting to decode the incomplete image frame (which can be displayed, or can be not displayed and only be used as a reference), and performing error concealment after the next frame arrives, and outputting a restored video image; finally, displaying the video image output by the decoder on a screen.

Figure 17:
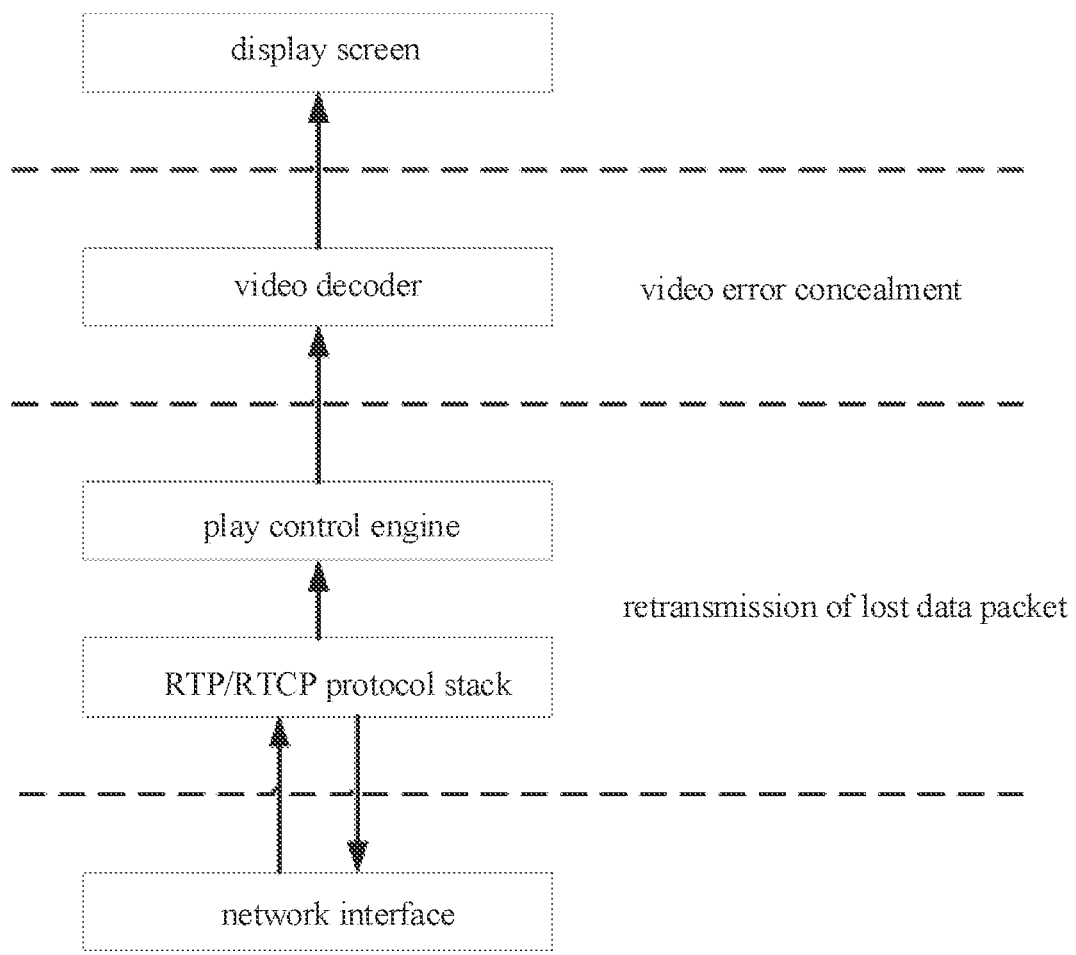
FIG. 17 is a schematic diagram of a system having a variety of video image restoration mechanisms.

FIG. 17 is a schematic diagram of a system having a variety of video image restoration mechanisms. Referring to FIG. 17, the image frame error concealment method provided by the present disclosure may be implemented by a section of a video decoder shown in FIG. 17. However, in the related art, the data retransmission and the restoration method realized by the cooperation of various decoders and a transport layer are implemented based on the transport layer. Because the two are different in implementation methods and restoration effects, in practical applications, it is always necessary to combine the above two or more restoration mechanisms with different levels and different methods together to achieve a more ideal image restoration effect.

Another aspect of the present disclosure provides a non-transitory computer-readable storage medium having computer program codes stored thereon which, when executed by a processor, implement the method as described above.

In an embodiment of the present disclosure, the computer program codes, when executed by the processor 1502 in the decoding apparatus 1500 shown in FIG. 15, can implement the method as described above.

For example, the image frame error concealment method of the present application can be implemented as a program of the image frame error concealment method, which is stored in the memory 1501 and can be loaded into the processor 1502 for execution, to implement the method of the present application.

When the image frame error concealment method of the present application is implemented as the computer program, it can also be stored as an article in the non-transitory computer-readable storage medium having the computer program codes. For example, the non-transitory computer-readable storage medium can include, but is not limited to a magnetic storage device (e.g., a hard disk, a floppy disk, a magnetic strip), an optical disk (e.g., a compact disk (CD), a digital versatile disk (DVD)), a smart card, and a flash memory device (e.g., an electrically erasable programmable read-only memory (EPROM), card, stick, key drive). In addition, various storage media described herein can represent one or more devices for storing information and/or other machine-readable mediums. The term "machine-readable medium" can include, but is not limited to, wireless channels and various other media (and/or storage media), which are capable of storing, containing, and/or bearing codes and/or instructions and/or data.

It should be understood that the embodiments described above are merely illustrative. The embodiments described herein can be implemented in hardware, software, firmware, middleware, microcode, or any combination thereof. For a hardware implementation, a processing unit may be implemented in one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or other electronic units designed to perform the functions described herein, or a combination thereof.

Basic concepts have been described above, but it should be apparent to those skilled in the art that the foregoing disclosure is taken as examples only, and is not intended to limit the present application. Although it is not explicitly stated herein, various modifications, improvements and adaptations to the present application may be made by those skilled in the art. Since such modifications, improvements and adaptations are suggested in the present application, they are intended to be within the spirit and scope of the exemplary embodiments of the present application.

Meanwhile, the present application uses specific words to describe the embodiments of the present application. For example, "one embodiment," "an embodiment," and/or "some embodiments" means a certain feature, structure, or characteristic related to at least one embodiment of the present application. Therefore, it should be emphasized and noted that "an embodiment" or "one embodiment" or "an alternative embodiment" mentioned two or more times in different positions throughout this specification does not necessarily refer to the same embodiment. Furthermore, certain features, structures, or characteristics in one or more embodiments of the present application can be appropriately combined.

The computer program codes required for the operation of each part of the present application can be written in any one or more programming languages including an object-oriented programming language such as Java, Scala, Smalltalk, Eiffel, JADE, Emerald, C++, C#, VB.NET, Python, a conventional procedural programming language such as C language, Visual Basic, Fortran 2003, Perl, COBOL 2002, PUP, ABAP, a dynamic programming language such as Python, Ruby, and Groovy, or other programming languages, or the like. The program codes may run completely on a user's computer, or run as a stand-alone software package on the user's computer, or run partly on the user's computer and partly on a remote computer, or run completely on the remote computer or server. In the latter case, the remote computer can be connected with the user's computer through any network form, such as a local area network (LAN) or a wide area network (WAN), or connected to an external computer (for example, through the Internet), or in a cloud computing environment, or used as a service such as software as a service (SaaS).

In addition, unless explicitly stated in the claims, the order of processing elements and sequences, use of numbers and letters, or use of other names described in this application are not intended to limit the order of the flows and methods in this application. Although some embodiments of the present disclosure, which are currently considered useful, have been discussed in the foregoing disclosure through various examples, it should be understood that such details are only for the purpose of illustration. The attached claims are not merely limited to the disclosed embodiments, but, on the contrary, they are intended to cover all modifications and equivalent combinations conforming to the essence and scope of the embodiments of the present application. For example, although the system components described above can be implemented by a hardware device, they can also be implemented by only a software solution, such as the described system being installed on an existing server or mobile device.

Similarly, it should be noted that for the purpose of simplifying the description of the disclosure of the present application and thus aiding in the understanding of one or more embodiments of the application, a plurality of features, in the foregoing description of the embodiments of the present application, are sometimes incorporated into one embodiment, accompanying drawing, or description thereof. Such a disclosure, however, is not intended to imply that features required for an object of the present application are more than those recited in the claims. In fact, features of an embodiment are less than all features of a single embodiment disclosed above.

Although the present disclosure has been described with reference to the current specific embodiments, it should be realized by a person having ordinary skills in the art that the above embodiments are merely used for illustrating the present disclosure and that various equivalent changes or substitutions can also be made without departing from the spirit of the present disclosure, and therefore, changes and variations to the above embodiments made within the substantial spiritual scope of the present disclosure all would fall within the scope of the claims of the present application.

What is claimed is:

1. An image frame error concealment method comprising the following steps:
   determining whether an nth image frame has a packet loss error; and
   if the nth image frame has a packet loss error, not performing error concealment on the nth image frame, and performing error concealment on an (n+1)th image frame, wherein the error concealment operation is performed with reference to one or more image frames before the nth image frame, wherein n is an integer greater than or equal to 2,
   wherein the step of performing error concealment on an (n+1)th image frame comprises:
   decoding a first-type intra macroblock capable of being directly and independently decoded in the (n+1)th image frame;
   decoding a second-type intra macroblock which depends on only the first-type intra macroblock, in the (n+1)th image frame;
   performing error concealment on an inter macroblock in the (n+1)th image frame with reference to one or more image frames before the nth image frame; and
   performing error concealment on a third-type intra macroblock not capable of being directly and independently decoded in the (n+1)th image frame.

2. The method according to claim 1, wherein the method further comprises decoding an (n+2)th image frame, the decoding operation being performed with reference to the (n+1)th image frame.

3. The method according to claim 1, wherein the step of performing error concealment on an inter macroblock in the (n+1)th image frame with reference to one or more image frames before the nth image frame comprises:
   decoding a motion vector of the inter macroblock;
   calculating candidate motion vectors;
   selecting a target motion vector from the candidate motion vectors; and
   acquiring a reference macroblock from one or more image frames before the nth image frame according to the target motion vector, and decoding the current inter macroblock according to the reference macroblock.

4. The method according to claim 1, wherein the step of performing error concealment on a third-type intra macroblock not capable of being directly and independently decoded in the (n+1)th image frame comprises:
   acquiring a prediction mode of the current third-type intra macroblock;
   searching remaining third-type intra macroblocks for a related third-type intra macroblock which takes the current third-type intra macroblock as a reference macroblock and has the same prediction mode;
   acquiring a plurality of sets of candidate reference pixels of the current third-type intra macroblock and the related third-type intra macroblock;
   decoding the current third-type intra macroblock and the related third-type intra macroblock by using the plurality of sets of candidate reference pixels, to select a target reference pixel; and
   decoding the current third-type intra macroblock and the related third-type intra macroblock according to the target reference pixel.

5. A decoding apparatus, comprising:
   a memory for storing instructions executable by a processor; and
   the processor for executing the instructions to implement the method according to claim 1.

6. A non-transitory computer-readable storage medium having computer program codes stored thereon which, when executed by a processor, implement the method according to claim 1.

7. An image frame error concealment method comprising the following steps:
   determining whether an nth image frame has a packet loss error; and
   if the nth image frame has a packet loss error, not performing error concealment on the nth image frame, and performing error concealment on an (n+1)th image frame, wherein the error concealment operation is performed with reference to one or more image frames before the nth image frame, wherein n is an integer greater than or equal to 2, wherein when it is determined that the nth image frame has a packet loss error, the method further comprises:
attempting to decode the nth image frame; and
determining whether one or more macroblocks can be obtained by the decoding, and if so, the error concealment operation comprising performing error concealment with reference to the one or more macroblocks and one or more image frames before the nth image frame, and if not, discarding the nth image frame;
wherein the nth image frame is not displayed.

8. The method according to claim 7, wherein the step of performing error concealment on an (n+1)th image frame comprises:
decoding a first-type intra macroblock capable of being directly and independently decoded in the (n+1)th image frame;
decoding a second-type intra macroblock which depends on only the first-type intra macroblock capable of being directly and independently decoded, in the (n+1)th image frame;
performing error concealment on an inter macroblock in the (n+1)th image frame with reference to one or more macroblocks of the nth image frame and one or more image frames before the nth image frame; and
performing error concealment on a third-type intra macroblock not capable of being directly and independently decoded in the (n+1)th image frame.

9. The method according to claim 8, wherein the step of performing error concealment on an inter macroblock in the (n+1)th image frame with reference to one or more image frames before the nth image frame comprises:
decoding a motion vector of the inter macroblock;
calculating candidate motion vectors;
determining a position of an image frame in which a reference macroblock is located according to the motion vector;
when the reference macroblock is located in the nth image frame, directly decoding the inter macroblock according to the reference macroblock, and ending the process;
when the reference macroblock is located in one or more image frames before the nth image frame, selecting a target motion vector from the candidate motion vectors; and
acquiring a reference macroblock from one or more image frames before the nth image frame according to the target motion vector, and decoding the current inter macroblock according to the reference macroblock.

10. The method according to claim 8, wherein the step of performing error concealment on a third-type intra macroblock not capable of being directly and independently decoded in the (n+1)th image frame comprises:
acquiring a prediction mode of the current third-type intra macroblock;
searching remaining third-type intra macroblocks for a related third-type intra macroblock which takes the current third-type intra macroblock as a reference macroblock and has the same prediction mode;
acquiring a plurality of sets of candidate reference pixels of the current third-type intra macroblock and the related third-type intra macroblock;
decoding the current third-type intra macroblock and the related third-type intra macroblock by using the plurality of sets of candidate reference pixels, to select a target reference pixel; and decoding the current third-type intra macroblock and the related third-type intra macroblock according to the target reference pixel.

11. An image frame error concealment apparatus, comprising:
an error detection module for determining whether an nth image frame has a packet loss error; and
an error concealment module for when the nth image frame has a packet loss error, not restoring the nth image frame, and performing error concealment on an (n+1)th image frame, wherein the error concealment operation is performed with reference to one or more image frames before the nth image frame, wherein n is an integer greater than or equal to 2,
wherein the error concealment module comprises:
a first decoding unit for decoding a first-type intra macroblock capable of being directly and independently decoded in the (n+1)th image frame;
a second decoding unit for decoding a second-type intra macroblock which depends on only the first-type intra macroblock capable of being directly and independently decoded, in the (n+1)th image frame;
a first error concealment unit for performing error concealment on an inter macroblock in the (n+1)th image frame with reference to one or more image frames before the nth image frame; and
a second error concealment unit for performing error concealment on a third-type intra macroblock not capable of being directly and independently decoded in the (n+1)th image frame.

12. The apparatus according to claim 11, wherein the error concealment module is further used to decode an (n+2)th image frame, the decoding operation being performed with reference to the (n+1)th image frame.

13. The apparatus according to claim 11, wherein the first error concealment unit is configured to perform error concealment as follows:
decoding a motion vector of the inter macroblock;
calculating candidate motion vectors;
selecting a target motion vector from the candidate motion vectors; and
acquiring a reference macroblock from one or more image frames before the nth image frame according to the target motion vector, and decoding the current inter macroblock according to the reference macroblock.

14. The apparatus according to claim 11, wherein the second error concealment unit is configured to perform error concealment as follows:
acquiring a prediction mode of the current third-type intra macroblock;
searching remaining third-type intra macroblocks for a related third-type intra macroblock which takes the current third-type intra macroblock as a reference macroblock and has the same prediction mode;
acquiring a plurality of sets of candidate reference pixels of the current third-type intra macroblock and the related third-type intra macroblock;
decoding the current third-type intra macroblock and the related third-type intra macroblock by using the plurality of sets of candidate reference pixels, to select a target reference pixel; and
decoding the current third-type intra macroblock and the related third-type intra macroblock according to the target reference pixel.

15. An image frame error concealment apparatus, comprising:
  an error detection module for determining whether an nth image frame has a packet loss error; and
  an error concealment module for when the nth image frame has a packet loss error, not restoring the nth image frame, and performing error concealment on an (n+1)th image frame, wherein the error concealment operation is performed with reference to one or more image frames before the nth image frame, wherein n is an integer greater than or equal to 2,
  wherein the error concealment module is further used to attempt to decode the nth image frame and determine whether one or more macroblocks can be obtained by the decoding when it is determined that the nth image frame has a packet loss error;
  wherein if one or more macroblocks can be obtained by the decoding, the error concealment module is configured to perform error concealment with reference to the one or more macroblocks and one or more image frames before the nth image frame, and if one or more macroblocks cannot be obtained by the decoding, the error concealment module is configured to discard the nth image frame, and
  wherein the nth image frame is not displayed.

16. The apparatus according to claim 15, wherein the error concealment module comprises:
  a first decoding unit for decoding a first-type intra macroblock capable of being directly and independently decoded in the (n+1)th image frame;
  a second decoding unit for decoding a second-type intra macroblock which depends on only the first-type intra macroblock capable of being directly and independently decoded, in the (n+1)th image frame;
  a first error concealment unit for performing error concealment on an inter macroblock in the (n+1)th image frame with reference to one or more macroblocks of the nth image frame and one or more image frames before the nth image frame; and
  a second error concealment unit for performing error concealment on a third-type intra macroblock not capable of being directly and independently decoded in the (n+1)th image frame.

17. The apparatus according to claim 16, wherein the first error concealment unit is configured to perform error concealment as follows:
  decoding a motion vector of the inter macroblock;
  calculating candidate motion vectors;
  determining a position of an image frame in which a reference macroblock is located according to the motion vector;
  when the reference macroblock is located in the nth image frame, directly decoding the inter macroblock according to the reference macroblock, and ending the process;
  when the reference macroblock is located in one or more image frames before the nth image frame, selecting a target motion vector from the candidate motion vectors; and
  acquiring a reference macroblock from one or more image frames before the nth image frame according to the target motion vector, and decoding the current inter macroblock according to the reference macroblock.

18. The apparatus according to claim 16, wherein the second error concealment unit is configured to perform error concealment as follows:
  acquiring a prediction mode of the current third-type intra macroblock;
  searching remaining third-type intra macroblocks for a related third-type intra macroblock which takes the current third-type intra macroblock as a reference macroblock and has the same prediction mode;
  acquiring a plurality of sets of candidate reference pixels of the current third-type intra macroblock and the related third-type intra macroblock;
  decoding the current third-type intra macroblock and the related third-type intra macroblock by using the plurality of sets of candidate reference pixels, to select a target reference pixel; and
  decoding the current third-type intra macroblock and the related third-type intra macroblock according to the target reference pixel.

* * * * *